United States Patent [19]

Neyman

[11] Patent Number: 5,917,987
[45] Date of Patent: Jun. 29, 1999

[54] SYSTEM FOR CONTROLLING THE TRANSFER OF AN IMAGE ON A FIRST MEDIUM TO A SECOND MEDIUM

[76] Inventor: Yuri Neyman, 12115 Laurel Terrace Dr., Studio City, Calif. 91604

[21] Appl. No.: 08/699,153

[22] Filed: Aug. 16, 1996

[51] Int. Cl.[6] ........................................................ H04N 9/79
[52] U.S. Cl. .............................. 386/42; 386/46; 348/188; 348/97
[58] Field of Search .................................. 386/42–43, 46, 386/127–130, 95, 57; 348/96, 97, 186, 645, 631, 722, 180, 182, 188; 360/3, 31; 396/319; 352/92; H04N 9/79

[56] References Cited

U.S. PATENT DOCUMENTS

| Re. 34,169 | 1/1993 | Orsburn et al. | 258/27 |
|---|---|---|---|
| 4,513,318 | 4/1985 | Wilensky et al. | 348/188 |
| 4,575,124 | 3/1986 | Morrison | 348/188 |
| 4,730,214 | 3/1988 | Lambert et al. | 348/189 |
| 4,914,506 | 4/1990 | Kafer et al. | 348/182 |
| 4,991,007 | 2/1991 | Corley | 348/188 |
| 5,179,437 | 1/1993 | Kawada et al. | 348/188 |
| 5,483,259 | 1/1996 | Sachs | 348/189 |
| 5,682,458 | 10/1997 | Funazaki | 386/128 |
| 5,684,919 | 11/1997 | Kikuzawa et al. | 386/95 |

FOREIGN PATENT DOCUMENTS 1352-670-A 11/1987 U.S.S.R. ...................... H04N 17/040

OTHER PUBLICATIONS

Vectorscope, Tektronix, Inc pp. 1–4, Oct. 1967.
Wavefom Monitor, Tektronics, Inc pp. 1–4, Feb. 1967.

Primary Examiner—Wendy Garber
Assistant Examiner—Vincent F. Boccio
Attorney, Agent, or Firm—Oppenheimer Wolff & Donnelly LLP

[57] ABSTRACT

A system for controlling the integrity of an image recorded on a first recording medium, for example, film, and transferred to a second recording medium, for example, videotape. The system includes a control chart having a set of chart control information and a plurality of control strips each having a set of strip control information. The control chart, which is for use by a cinematographer on a set, is recordable on the film under substantially the same conditions under which the image is recorded onto the film. Each of the control strips, which are for use by a telecine colorist at a transfer machine, is formatted to correspond to a different type of commercially available film so that one of the control strips corresponds to the film on which the image is recorded. The set of strip control information on each of the control strips includes information substantially the same as information included in the set of chart control information. Thus, the same control information is provided to both the cinematographer and the telecine colorist. The sets of chart and strip control information include information for use by the telecine colorist in adjusting the settings of the transfer machine such that the integrity of the image transferred to the videotape is substantially the same as the integrity of the image recorded on the film, for example, density, luminance, and color information.

10 Claims, 13 Drawing Sheets

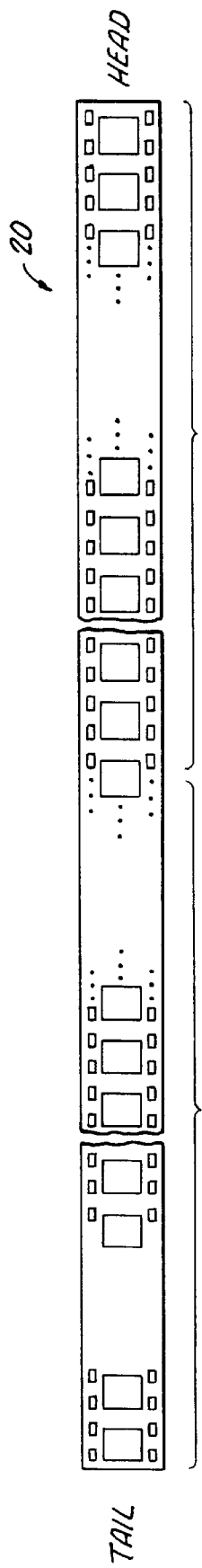
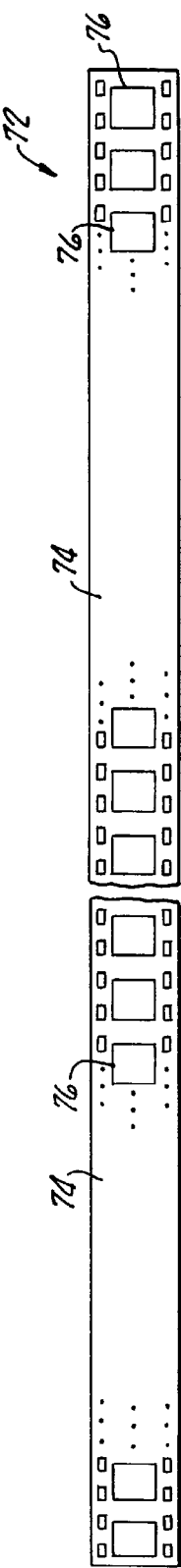
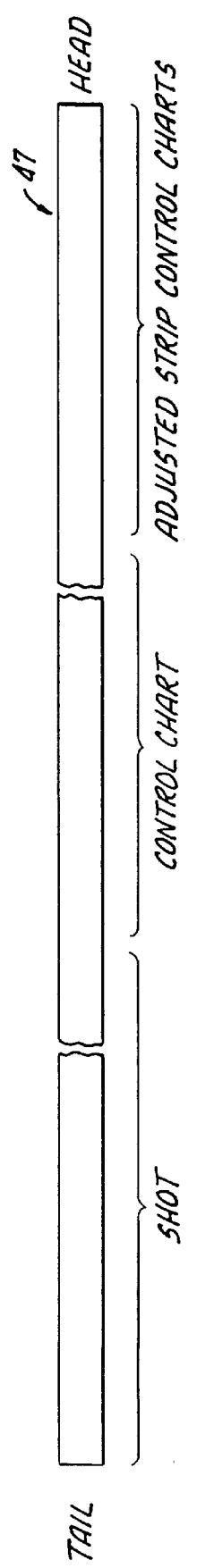
Fig. 3.
Fig. 5.
Fig. 11.

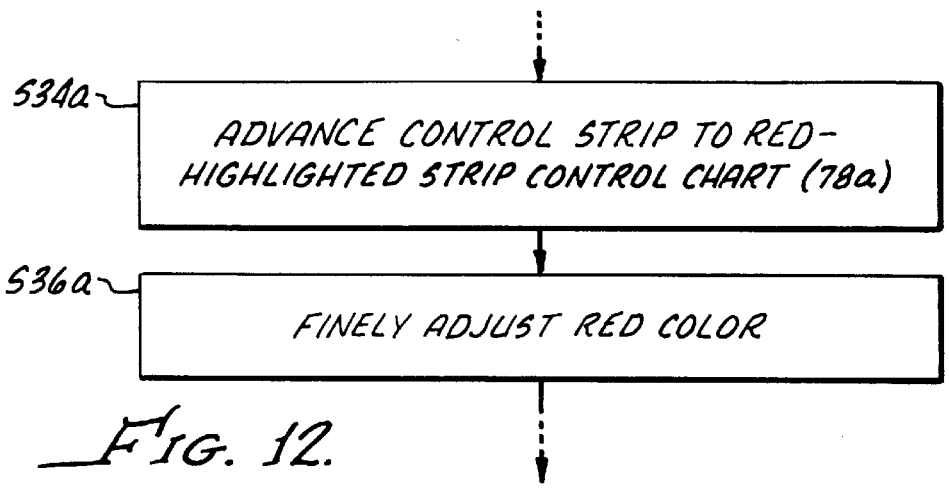
_Fig. 12._
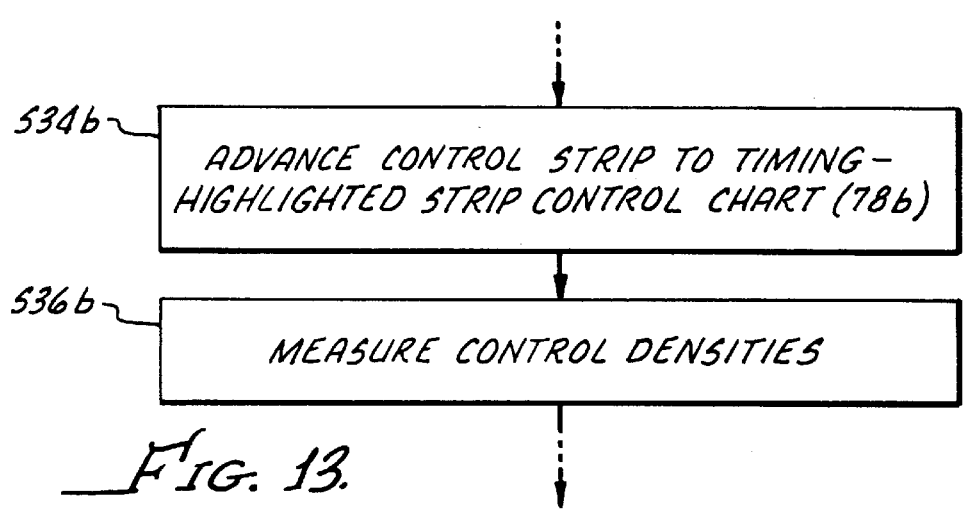
_Fig. 13._
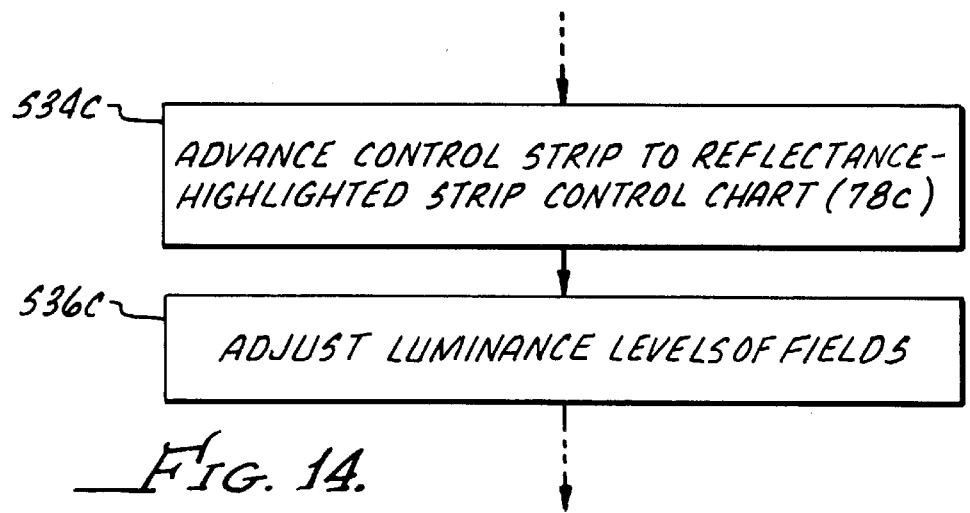
_Fig. 14._

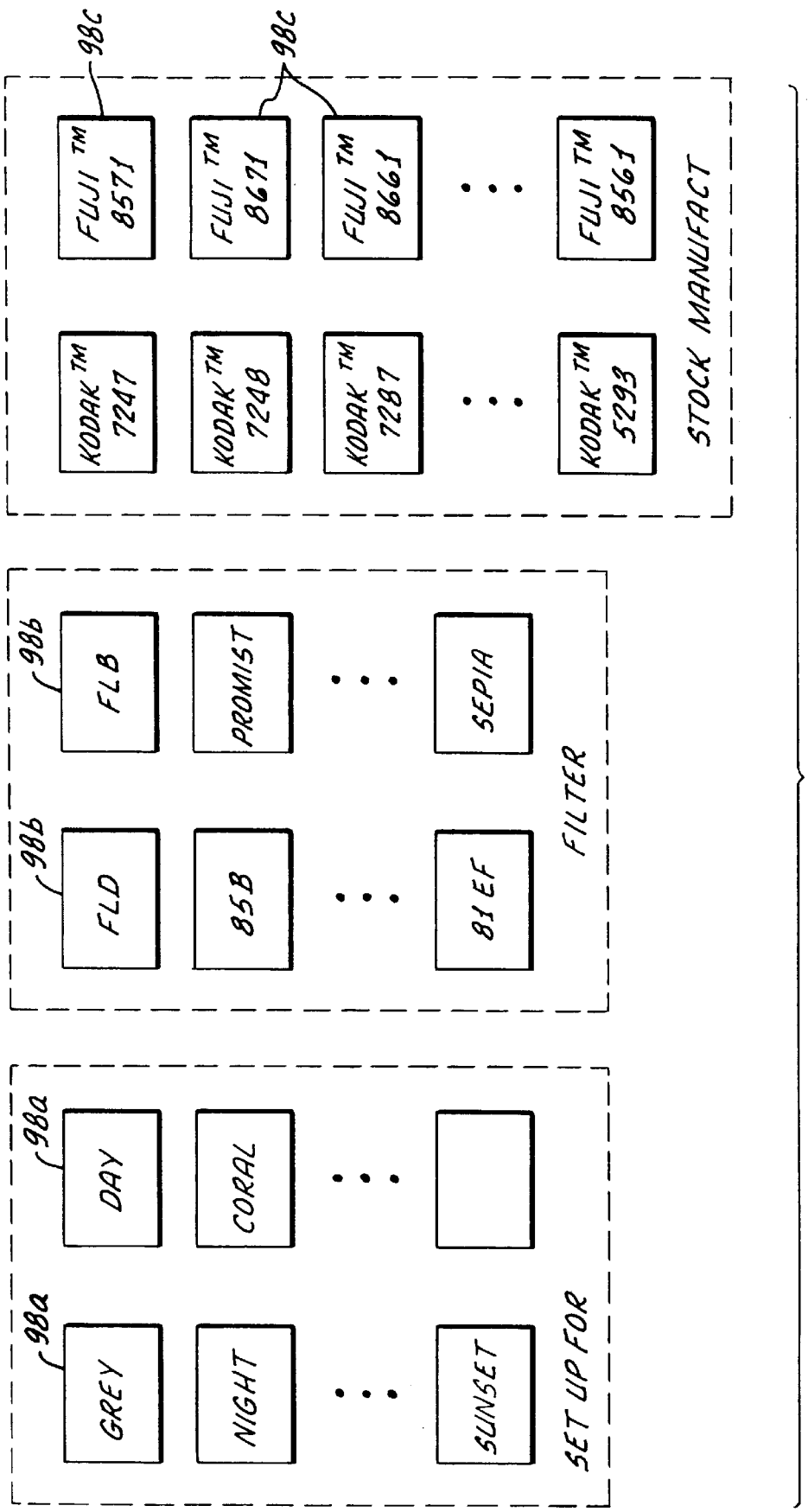

SYSTEM FOR CONTROLLING THE TRANSFER OF AN IMAGE ON A FIRST MEDIUM TO A SECOND MEDIUM

FIELD OF THE INVENTION

The present invention relates to film-to-video transfer technology and, more particularly, to a film-to-video transfer system which standardizes the transfer of images on film to videotape.

BACKGROUND OF THE INVENTION

The technology revolution is transforming the film industry, like most other industries today, in ways not imagined only a few years ago. While advances have been made in lighting, sound, optics, and the film itself, by far the most significant advances have been made in relation to post-production facilities which have become high-tech havens for film technicians and special effects artists. Post-production facilities are filled with computers and other electronic equipment, increasing the versatility, the efficiency, and the productivity of motion-picture production.

While the actual shooting of the motion picture on the set may be thought of as the "artistic" side of the production process involving directors, cinematographers, actors, and writers, the post-production of the film itself may be thought of as the "technical" side of the production process. And like other production processes which involve an artistic side as well as a technical side, the two sides often do not see eye to eye.

The Video Daily

As a result of the technological advances in recent years within the film industry, specifically computerized editing, production companies have increasingly relied upon the video daily. The video daily is a videotape of what was shot on film on the set on that particular day. The video daily is used by the cinematographer and the director to evaluate how a particular shot will come out at the end of production.

Prior to the development of computerized editing, editing consisted of cutting and splicing pieces of the film. In order to do this, print dailies were made. This was accomplished by processing the film stock that was shot on the set, yielding a processed negative. The processed negative was then printed, yielding positive film. The positive film was then cut and spliced.

Computerized editing is faster and more versatile than the conventional print editing.

However, print dailies cannot be used in computers; therefore, the images on processed negative needs to be transferred to videotape in order to utilize computers in editing. Computerized editing is so common today that almost 70% of processed negatives (that is, the film shot on the set) never see the light of a printer for processing into print dailies.

In order to produce a video daily, the film shot on the set by the cinematographer needs to be transferred to videotape. More specifically, the individual images or photographs made by a motion-picture camera which collectively make up a shot need to be converted and transferred to videotape. To ensure that the end product, that is, the motion picture shown in a movie theater, is of the highest quality, the quality of the video daily should be maximized.

The quality of the video daily may be affected in a number of ways. However, by far the most influential cause of poor video dailies lies in the subjective eyes of the person who actually transfers the processed negative to videotape. This person is called a telecine colorist (pronounced TELL-A-SEE-KNEE). The telecine colorist, who often has a background in sound and video engineering, controls the machine in which the processed negative is loaded and from which the corresponding video daily is extracted. This machine is called a telecine machine. The word "telecine" is an old broadcasting term derived from tele for audio and cinema for video, but has come to refer to the transfer process, after the pioneering Rank-Cintel Color Tele-Cine Device.

The actual telecine machine may employ a number of electronic devices, such as amplifiers, coders, enhancers, and color correctors, as well as a number of monitoring devices, such as video display monitors, waveform monitors, oscilloscopes, and vectorscopes, to obtain an electronic interpretation of the images recorded on the film and to manipulate or control those images during the transfer process. The subjective portion of the process lies between loading the processed negative into the machine and actually pushing the "TRANSFER" button, metaphorically speaking, on the telecine machine to transfer the images from the film to the videotape.

Turning to the subjective eyes of the telecine colorist, indeed, the subjective eyes of any human being, what one person sees is seldom the same as what another person sees. This is particularly true about color. Even if the telecine colorist studies the theory of color intensely (assuming the cinematographer has also done the same) and becomes an accomplished colorist, this does not ensure any consistency in reading colors. Analogously, just as the knowledge of acoustics does not make one musical, neither on the productive nor on the appreciative side, no color system by itself can develop one's sensitivity for color. And as color is paramount in setting the mood and creating a feeling in a motion picture, color is one of the most important tools of the cinematographer in setting up a scene to be shot.

Tantamount in importance to color is lighting. The cinematographer has at his or her disposal a wide variety of lights with which to work in creating scenes. When working with light, one always has the complementary shadow. The amount of light radiating from a light area of a scene and a dark area of a scene is known as contrast. Photographic films are capable of recording a limited range of light and dark areas in a scene, much like the human eye. For example, if a person has a bright light shining in his or her eyes while standing in a dark room, that person will not be able to see anything in the shadows of the room until the light is moved away. In other words, the contrast between the bright light and the dark room is too great for the person's eyes handle.

This inconsistent, uncontrollable, and inferior ability of the eye to be able to maintain control of what it actually sees is well discussed by Josef Albers in his book INTERACTION OF COLOR (Yale University, 1963). And if the eyes of a single person possess such inferior abilities, the different eyes of different people are absolutely uncontrollable in what is actually seen by more than one pair of eyes. In demonstrating the how the eye works in reading light and color of a scene or photograph, the following discussion is provided, concentrating on color but being equally applicable to light (i.e., contrast).

If one says "red" (the name of the color) and there are 50 people listening, it can be expected that there will be 50 reds in their minds. And one can be sure that all these reds will be very different. Even when a certain color is specified which all listeners have seen innumerable times—such as the red of Coca-Cola™ signs which is substantially the same red all over the world—they will still think of many different reds. Even if all the listeners have hundreds of reds in front of them from which to choose the Coca-Cola red, they will again select quite different colors. And no one can be sure that he has found the precise red shade. And even if that round, red Coca-Cola sign with the white name in the middle is actually shown so that everyone focuses on the same red, each will receiver the same projection on his retina, but no one can be sure whether each has the same perception.

In musical compositions, so long as we hear merely single tones, we do not hear music. Hearing music depends on the recognition of the collective interaction of individual tones, their placing and their spacing, in creating harmony and melody. In writing, a knowledge of spelling has nothing to do with an understanding of poetry. Equally, a factual identification of light and colors within a given scene has nothing to do with a sensitive seeing nor with an understanding of the light action or the color action within the scene.

Although we are able to hear a single tone, we almost never (that is, without special devices) see a single color unconnected and unrelated to other colors. Colors present themselves in continuous flux, constantly related to changing neighbors and changing conditions.

Imagine in front of us three pots of water, from left to right:

| WARM | LUKEWARM | COLD |
| --- | --- | --- |

When the hands are dipped first into the outer containers, one feels, i.e., experiences and perceives, two different temperatures:

| WARM (at left) | (at right) COLD |
| --- | --- |

Then dipping both hands into the middle container, one perceives again two different temperatures, this time, however, in reversed order:
(at left) COLD–WARM (at right)
though the water is neither of these temperatures, but of another, namely:
LUKEWARM Herewith one experiences a discrepancy between physical fact and psychic effect called, in this case, a haptic illusion (haptic being related to the sense of touch) of the haptic sense. In much the same way as haptic sensations deceive us, so optical illusions deceive. They lead us to "see" and to "read" light and colors other than those with which we are confronted physically.

If one is not able to distinguish the difference between a higher tone and a lower tone, one probably should not make music. If a parallel conclusion were applied to color, almost everyone would prove incompetent for working with color. Very few people are able to distinguish higher and lower light intensity between different hues.

Since the discovery of photography and particularly since the development of photomechanical reproduction processes, we are exposed to pictures from all over the world. Black-and-white pictures are printed in only one black on a white background. Visually, however, these pictures consist of grey shades of the finest gradations between polar extremes of black and white. These shades penetrate each other in varying degrees. In color photography and color reproduction, a parallel reading of lighter and darker color is necessary.

In visualizing a scene and subsequently photographing a scene, the sensitivity and consequently the registration of the retina of an eye is different from the sensitivity and the registration of a photographic film. For example, black-and-white film generally registers all lights lighter and all darks darker than the what the eye perceives. This is why film companies have developed many different types of film which are more sensitive to different colors. For example, two of the color slide films which Eastman Kodak™ markets is Kodachrome™ and Ektachrome™. Kodachrome was developed to enhance warms colors like reds and yellows, and Ektachrome was developed to enhance cool colors like greens and blues. In motion picture film, there are on the order of 20 or more different films available to the cinematographer. Also, photographic equipment manufactures develop a myriad of filters to aide the photographer in recording a scene as desired. All of these aide the cinematographer in setting up a scene to be shot, and all lead to variations in color in the resulting processed negative.

However, the production of the video daily of what the cinematographer has just shot is now in the hands (rather, the eyes) of the telecine operator (the technician) and not the hands of the cinematographer (the artist). By making subjective adjustments to the telecine machine, the telecine operator may lose contrast in the image, thereby losing important detail in dark shadowed areas or bright highlighted areas.

From the foregoing, the light and the color which the cinematographer sees and has in mind in all likelihood is not be the same light and color which the telecine colorist sees when transferring the film to videotape. Accordingly, the video daily will not maintain the integrity of the images on the film and, thus, will not provide the cinematographer with a true reproduction of the scene to be evaluated by the video daily. Further, in addition to the subjectivity of the colorist, eye fatigue of the colorist adds to the inconsistent and poor quality of video dailies. Also, the settings of the telecine machine may "drift," causing further inconsistent transfer of images onto videotape.

Conventional film-to-video transfer techniques suffer prevalent and frustrating problems in the discrepancy between what the cinematographer and the telecine colorist respectively see and what the telecine colorist subsequently acts upon in producing the video daily.

SUMMARY OF THE INVENTION

It is an object of the present invention to provide an image-transfer control system which mitigates and/or obviates the drawbacks of conventional video daily production.

It is another object of the invention to provide a control system which eliminates subjectivity in transferring images on film to videotape.

It is still another object of the invention to provide a control system which maintains the integrity of an image transferred from one film medium to another.

It is a further object of the present invention to provide a control system which preserves contrast of an image transferred from one film medium to another.

It is yet another object of the invention to provide a control system which increases the productivity and efficiency of transferring images from film to videotape.

It is a still further object of the invention to provide a control system which insures that an image transferred from film to videotape maintains the cinematographer's vision of the image originally.

These objects, as well as other objects, features, and benefits of the present invention are achieved by providing a system for controlling the transfer of an image recorded on a first recording medium of a first category of recording media, for example, motion-picture film, to a second recording medium of a second category of recording media, for example, videotape. The transfer of the image is carried out by a telecine colorist on a transfer machine which has a number of settings which control the transfer of the image. The system includes a control chart having a set of chart control information and a plurality of control strips each having a set of strip control information.

The control chart is recordable on the first recording medium under substantially the same conditions under which the image is recorded onto the first recording medium. For example, if the image is an image from a scene on a film set, then the control chart may be shot on film prior to shooting the image (i.e., the scene).

Each of the control strips is formatted to correspond to a different recording medium included in the first category of recording media so that one of the control strips corresponds to the first recording medium on which the image is recorded. For example, if the image is recorded on motion-picture film, then each of the control strips is made from a different type of commercially available motion-picture film; therefore, if the image is recorded on 16-mm film, there will be one of the control strips made from the same 16-mm film.

The set of strip control information on each of the control strips includes information substantially the same as information included in the set of chart control information. Also, the sets of chart and strip control information include information for use by the telecine colorist in adjusting the settings of the transfer machine such that the integrity of the image transferred to the second medium is substantially the same as the integrity of the image recorded on the first recording medium. Therefore, substantially the same control information is provided at the location where the image is initially recorded, for example, on a film set, and at the location where the image is transferred to the second medium, that is, at the transfer machine. By doing so, integrity of the image may be maintained, and subjectivity of the telecine colorist is eliminated.

According to another aspect of the system of the present invention, a plurality of removable labels are provided so that information may be applied to the control chart indicating various conditions under which the image is recorded. For example, the plurality of removable labels may include labels respectively corresponding to every recording medium in the first category of recording media. The control chart may then also includes an information area having a locale at which the removable label corresponding to the first recording medium is positionable, thereby indicating to the telecine colorist which of the control strips to use in adjusting the setting of the transfer machine. The plurality of removable labels may also include labels corresponding to a different effect used in recording the image onto the first recording medium or to a different condition under which the image is recorded onto the first recording medium.

In maintain the integrity of the image during the transfer process, the sets of chart and strip control information include information for adjusting the various settings of the transfer machine. For example, if the image to be transferred is a photographic image taken by a motion-picture camera onto film, then the image will be defined by a number of variables, including contrast, density, color, and so on. The transfer machine correspondingly includes settings for each of these photographic variables. Therefore, the sets of control information preferably include information for adjusting the settings of the transfer machine corresponding to, for example, density, luminance, and color.

Other aspects, features, and advantages of the present invention will become apparent to those skilled in the art from a reading of the following detailed description with reference to the accompanying drawings.

BRIEF DESCRIPTION OF THE DRAWINGS

FIG. 3 is a plan view of a strip of film stock shot in accordance with the control principles of the present invention;

FIG. 5 is a is a plan view of an exemplary embodiment of a control strip implemented in accordance with the present invention;

FIG. 11 is a plan view of a strip of videotape having images transferred thereon in accordance with the invention;

FIG. 12 is a partial flow chart corresponding to that of FIG. 9, illustrating preferred adjustment steps in an exemplary film-to-video transfer method according to the present invention;

FIG. 13 is a partial flow chart similar to that of FIG. 12, illustrating further preferred adjustment steps in the film-to-video transfer method of the present invention;

FIG. 14 is a partial flow chart similar to those of FIGS. 12 and 13, illustrating still further preferred adjustment steps in the film-to-video transfer method of the invention;

FIG. 17 is a plan view illustrating a plurality of reference labels in accordance with the present invention;

DETAILED DESCRIPTION OF THE PREFERRED EMBODIMENT

Broadly speaking, the present invention provides a system which standardizes the transfer of an image recorded on one medium to another medium. For example, the system of the present invention may be used to transfer images (e.g., scenes, shots, photographs, etc.) recorded on photographic film (e.g., still or motion picture) to videotape.

Prior to describing exemplary embodiments of the invention, reference is made to a number of definitions of relevant terms specific to the art provided at the end of this detailed description. The definitions are provided in order to allow those people not possessing a high degree of skill in the art to understand more fully the principles set forth herein.

Figure 1:
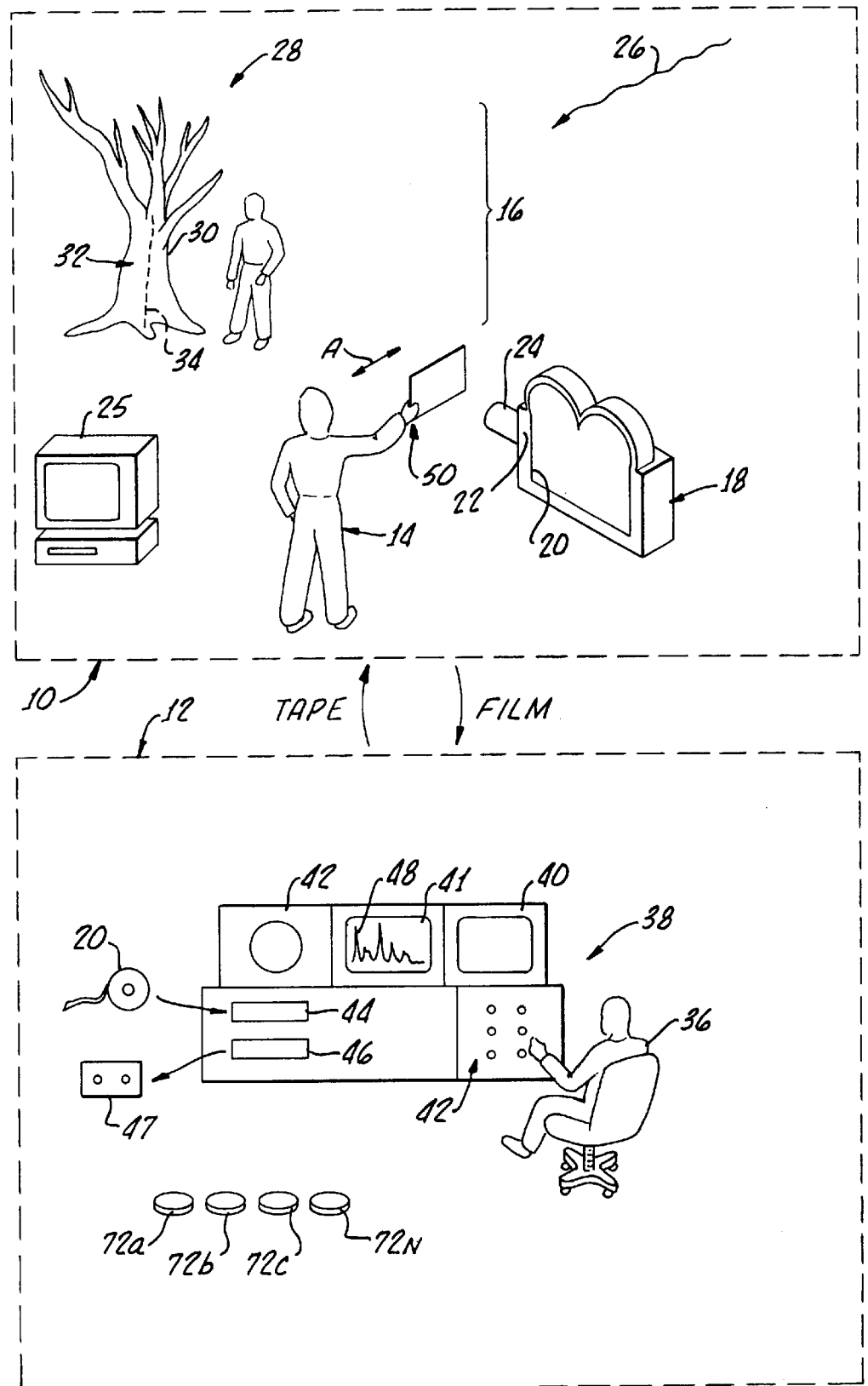
FIG. 1 is a diagram illustrating an exemplary scenario of transferring images recorded on motion-picture film to videotape in accordance with the principles of the present invention.

Referring to the drawings, FIG. 1 illustrates an exemplary film-to-video scenario in which the technology of the present invention may be applied. The exemplary scenario involves filming a motion picture at one location and transferring the motion picture onto videotape at another location. The film location and the transfer location are generally indicated by reference numerals 10 and 12, respectively. The film location is known as a set, which may be on location outdoors or on a sound-stage at a film studio. The transfer location is known as a production (or post-production) facility, which may be a mobile unit or a fixed facility.

The Set

On the set 10, a cinematographer 14 (also known as a director of photography) adjusts the lighting conditions on the set to achieve a particular mood or feeling for a scene 16 to be shot by a motion picture camera 18. The lighting conditions may be adjusted and controlled by a multitude of lights and other various apparatus, such as reflective surfaces and shades, which apparatus are not shown in the drawings.

The amount of light from the scene 16 reaching film 20 in the camera 18 is controlled by an aperture 22 behind a lens 24. The size of the aperture 22 is adjustable and is known as an f-stop. The f-stops are fractions, with the numerator always being one (1) and the denominator indicating the size of the aperture, e.g., ½.3, ¼, ⅕.6, ⅛, ¹⁄₁₆, and so one. Thus, the larger the denominator, the smaller the aperture. Apertures are commonly read as the letter "f" followed by the denominator; for example, an f-stop of ¹⁄₁₆ is read as "F sixteen." In addition to the aperture 22, one or more out of hundreds of commercially available filters (not shown) may be used to alter and to adjust the light before it pass through the lens 24 to expose the film 20, which is known in the art.

The cinematographer 14, who is an expert in the art and science of light, works together with a director. The two artists decide how a particular scene or shot should look before it is shot, and the cinematographer 14 then adjusts the lighting to achieve the desired effect. However, what the cinematographer 14 and the director see on the set 10 may not always translate to the film when viewed in a movie theater. Therefore, the cinematographer 14 likes to see how the shot turned out before moving onto other scenes, shots, and locations. Therefore, the film 20 on which the scene 16 is shot is transferred onto videotape on a daily basis. The videotape, known as a daily, is then returned to the cinematographer 14 for viewing on a monitor or television set 25.

On the exemplary set 10 illustrated in the drawings, light 26 is directed from an upper right-hand corner of FIG. 1. Therefore, the light 26 creates highlighted areas and corresponding shadowed areas on the objects within the scene 16. For example, a tree 28 located in the scene 16 has a highlighted side 30 and a shadowed side 32, which are illustratively divided by phantom line 34. The highlighted and shadowed areas 30 and 32 present contrast in the scene 16. Although the tree 28 is the substantially the same color in both areas 30 and 32, the highlighted area 30 has a higher luminance value than that of the shadowed area 32.

Taking the lighting conditions on the set at hand, the cinematographer 14 adjusts and sets the lighting conditions for the specific shot using light meters to measure the light on objects within the scene. Various effects may be used to create a particular mood or special lighting condition for the scene 16. Effects include filters, gelled lights, and so on. The exposure on the camera 18 is also set. Exposure is a function of the shutter speed of the camera 18 and the aperture setting. As the shutter speed is fixed for motion picture camera, the cinematographer 18 adjusts the exposure by adjusting the aperture 22.

After setting the lighting conditions for the scene 16 and the exposure of the camera 18, the scene 16 may now be shot.

The Production Facility

At the production facility 12, a telecine colorist 36 operates a telecine machine 38 (which is exaggerated in size in FIG. 1). The telecine machine 38 includes a display means such as a monitor 40, a waveform monitor 41, a vectorscope 42, a control panel 43, a film chamber 44, and a video chamber 46. The film 20 from the set 10 arrives at the production facility 12 on a spool. The film 20 is exposed in a series of frames. Particular to the illustrated embodiment, the film 20 arrives as processed negative film which is loaded into the film chamber 44 of the telecine machine 38. In operation, the telecine machine 38 generates and displays a video signal 48 on the waveform monitor 41, and transfers the images recorded on the film 20 to a videotape 47 for use by the cinematographer 14 back on the set 10. The videotape 47 is known as a daily.

The operation of the production facility in accordance with the present invention will be described in more detail below.

Shooting a Shot

In accordance with the film-to-video-transfer principles of the present invention, prior to shooting the scene 16, a control chart 50 is positioned within the scene 16, that is, within the area or the vicinity of the scene 16 which is under substantially the same lighting conditions as that of the scene 16. The control chart 50 is then shot (i.e., photographed) by the camera 18 on the same film 20 on which the scene 16 is to be shot. The chart 50 is then removed, and the scene 16 is shot without changing the lighting conditions on the set 10. Most easily, the chart 50 is moved into position in front of the lens 24 of the camera 18, held in position for a period of time, and removed, as shown by arrow A. These steps in the contrast-control method of the invention are preferably repeated for each shot, for each scene, and for each change in lighting conditions. If a second (or third) take needs to be done for the shot and if the lighting conditions have not changed, then it may not be necessary to reshoot the control chart 50 for each take if the additional takes are shot on the same film 20 on which the control chart 50 has already been shot.

Figure 2:
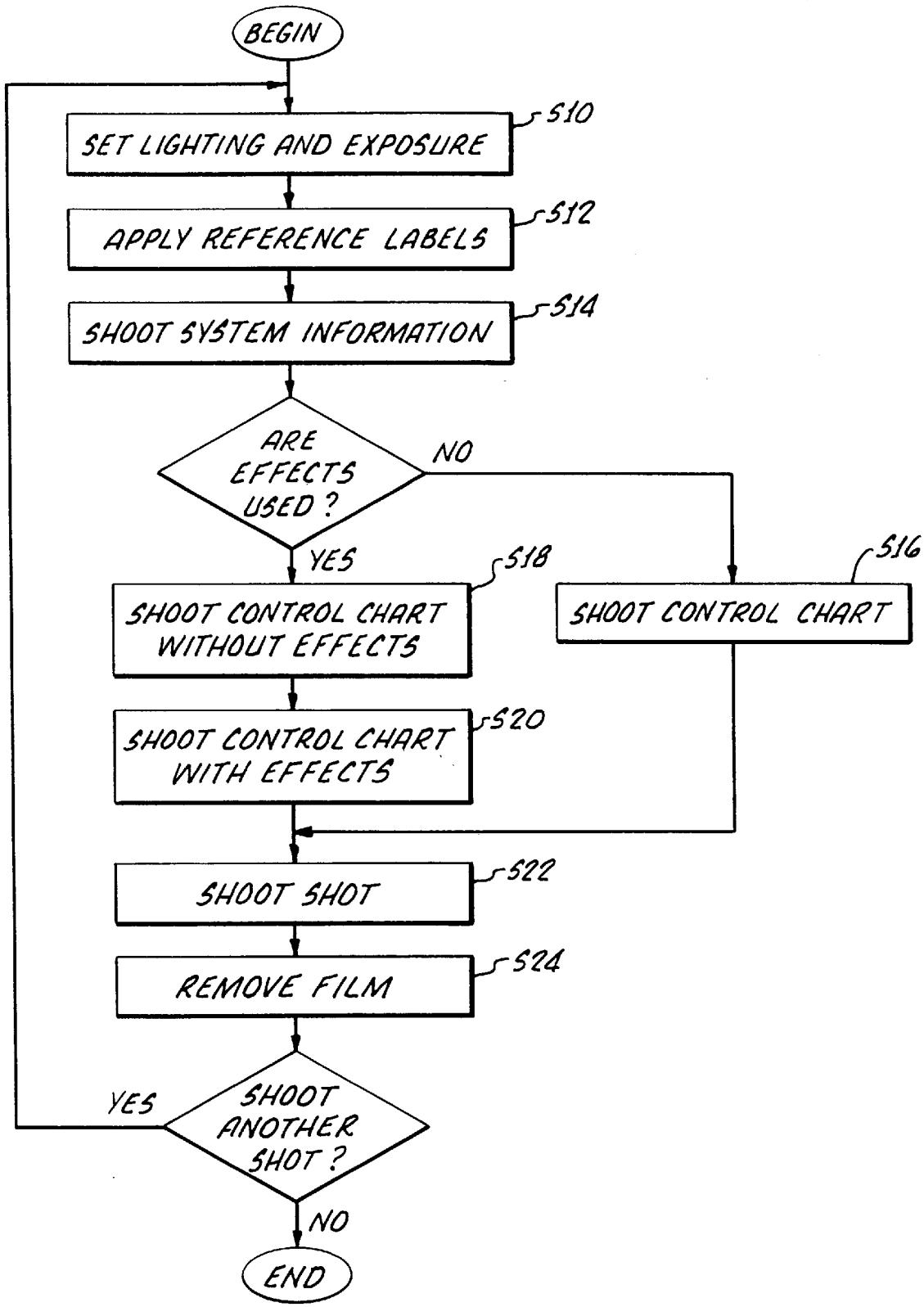
FIG. 2 is a flow chart outlining steps for shooting a shot including footage of a control chart according to the present invention.

More specifically, with additional reference to FIG. 2, after the cinematographer 14 has set the lighting and the exposure for the scene 16 (step S10) as described above, reference labels (not shown) may be applied to the control chart (step S12). The reference labels, which will be described below, may indicate the type of film being used to shoot the scene 16, the type of filter or other effect used on the camera 18 during the shoot, and so on. At this time, it is preferable to shoot system information which may indicate the film-to-video transfer system of the present invention and/or other information which may be useful to the telecine colorist 36.

After these preliminary steps, the control chart 50 may now be shot. If no effects are used, the control chart 50 is shot (step S16) at the set exposure, as described above. Preferably, the control chart 50 is shot using "white" light; that is, a light operated at 3,200 Kelvin (K.) or 5,500 K., which is known in the art. If effects are to be used to shoot the scene 16, then the control chart 50 is preferably shot twice: once without the effects (step S18) and once with the effects (step S20). When shooting the control chart 50 with the filtration and/or lighting effects (step S20), the chart 50 is preferably shot in key light or a simulation of the key light for the scene 16. The control chart 50 may be shot for any reasonable length of time, for example, 10 seconds to 30 seconds.

After shooting the control chart 50, the scene 16 may now be shot (step S22). The film 20 on which the scene 16 was shot is then removed from the camera 18 (step S24) and sent to the production facility 12 for transfer to the videotape 47. If another scene 16 is to be shot or if the lighting conditions are changed, the above-described on-set procedure is repeated, or at least a number of necessary steps are repeated such as steps S16–S22.

With additional reference to FIG. 3, each shot made according to the present invention preferably begins with footage (i.e., a consecutive series of frames) of the control chart 50 with footage of the shot following. According, the unprocessed film 20 removed from the camera 18 (step S22) and containing the shot is comprised of a number of frames (labelled as "Control Chart Footage" in FIG. 3) of the control chart 50 followed by the frames and footage of the shot of the scene 16 (labelled as "Shot"). The control chart footage may range anywhere from just a few frames to hundreds of frames of footage of the control chart 50, which will be discussed in more detail below.

The Control chart

Figure 4:
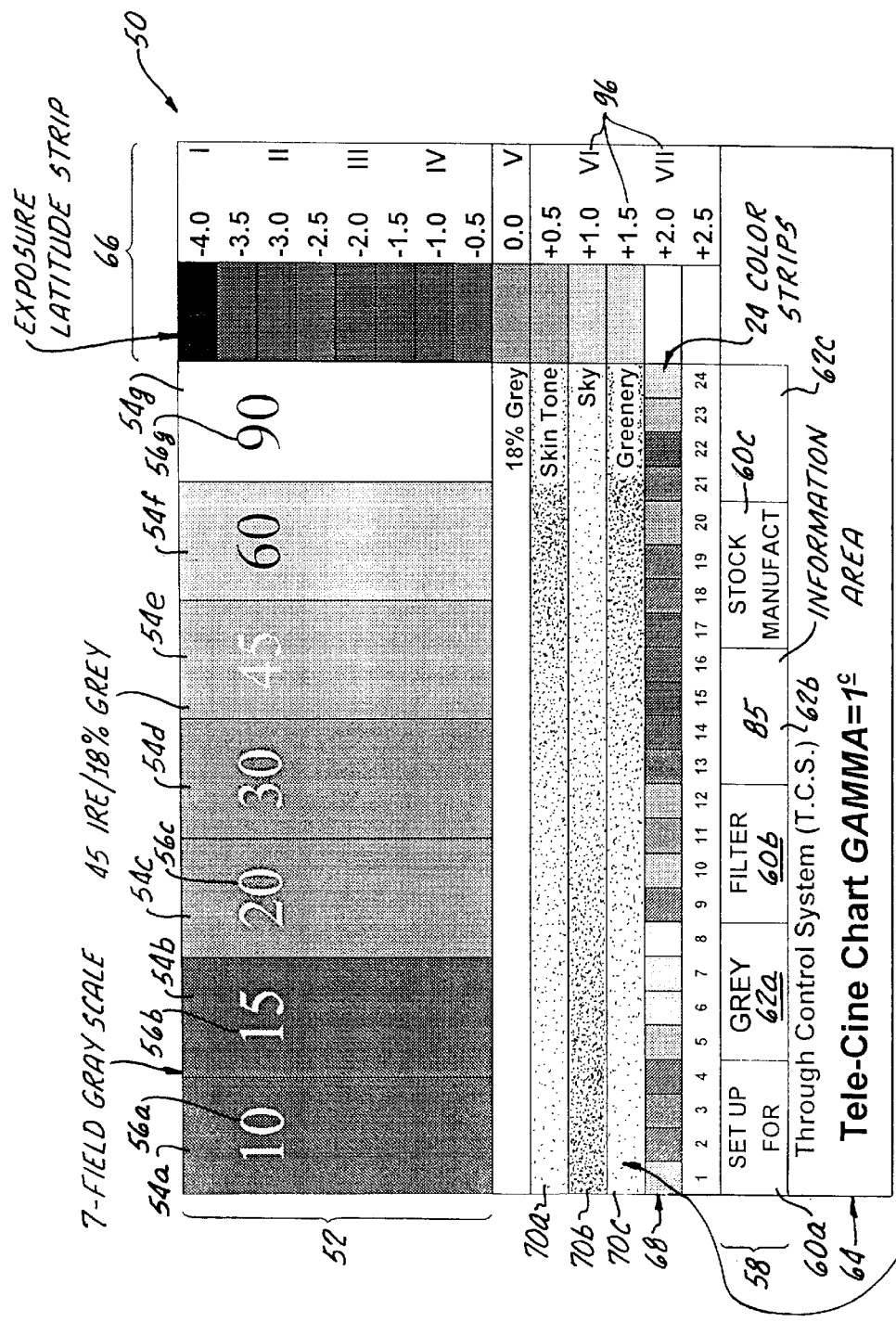
FIG. 4 is a diagram of a control chart for use by a cinematographer in shooting a shot in accordance with the invention.

With additional reference to FIG. 4, an exemplary embodiment of the control chart 50 configured according to the principles of the present invention is shown. The control chart 50 includes a reflectance area 52. The reflectance area 52 in turn includes a plurality of fields which are generally referenced with numeral 54 and specifically referenced with the addition of an alpha to reference numeral 54. In the exemplary embodiment shown, there are seven fields 54, i.e., 54*a*–54*g*, shown in the reflectance area 52. Each of the reflectance fields 54 has a unique coefficient of reflectance.

The coefficients of reflectance of the fields 54 preferably range from black (field 54*a*) to white (field 54*g*), with one of the fields 54 having a coefficient of reflectance equal to that of neutral grey (field 54*e*). The coefficients of reflectance of the fields 54 preferably correspond to standard values, for example, Institute of Radio Engineers (IRE) numbers. The IRE established a number system or scale which is used in broadcast specifications of video signal levels. The IRE scale is defined between a maximum level of a video signal, which has a value of 100, and a minimum level of a video signal, which is 7.5. In corresponding luminance values to these video signal levels, a peak-white level is defined as 100 IRE luminance units, and a S black level is defined as 7.5 IRE luminance units.

According to the present invention, it is preferable for the field 54 having the lowest coefficient of reflectance (i.e., field 54*a*) to correspond to 10 IRE units and for the field 54 having the highest coefficient of reflectance (i.e., field 54*g*) to correspond to 90 IRE units. The field 54 defined as neutral grey preferably has a coefficient of reflectance which corresponds to 45 IRE units. Forty-five IRE units corresponds to 18% neutral grey reflectance, which is a standard value for controlling reflectance and illuminance in professional exposure methoding systems.

Each of the fields 54 preferably has indicia such as a numeral 56 which indicates the number of IRE units corresponding to the coefficient of reflectance of the respective field 54. Accordingly, fields 54*a*–54*g* are respectively labeled with luminance numerals 56*a*–56*g* corresponding to a preferred range of luminance units: 10, 15, 20, 30, 45, 60, and 90. Ten IRE units and 90 IRE units correspond to the useful range of the negative film 20 to be transferred to video. Although the absolute range of the video transfer from the negative film 20 lies between 7.5 IRE units and 100 IRE units, the control chart 50 of the present invention uses 10 IRE units and 90 IRE units to leave room for possible adjustments during the final "on-line" transfer of the negative film 20 to video.

The control chart 50 preferably has a reference information area 58 which provides information on the particular shot which is useful for the telecine colorist 36. The information area 58 has a plurality of indicia blocks, generally referenced by numeral 60 and specifically by alphanumerics 60*a*–60*c*, and a corresponding plurality of label blocks 62 (specifically 62*a*–62*c*). Each of the indicia blocks 60 provides a different category of information, and each of the label blocks 62 provides a specific type of information within each category. For example, indicia block 60*b* reads "Filter"; accordingly, label block 62*b* corresponding thereto will be provided with a label indicating what type of filter was used to shoot the scene 16 (if a filter was used at all).

Preferably, the reference information area 58 includes an indicia block which reads "Stock Manufacture" (i.e., indicia block 60*c*). Thus, on the corresponding label block 62*c* is provided the type of film used in shooting the scene 16. As there are more than 20 different types of film which may be used, from a variety of manufacturers, it is important to let the telecine colorist 36 know what type of film was used to shoot the shot, which will be discussed in more detail hereunder.

The control chart 50 preferably further includes a system information area 64 which, as mentioned above, indicates to the telecine colorist 36 that the system according to the present invention was used to shoot the shot. The system information area 64 (as well as any of the other areas of the control chart 50) may be provided either on the front or on the back of the control chart 50. In the exemplary embodiment shown, the system information area 64 reads "Thorough Control System (T.C.S.)" which is a trademark of Gamma & Density Company, which is the assignee of the present invention. The system information area 64 may also provide instructions to the telecine colorist 36, which will be discussed in more detail below.

The control chart 50 may also have any or all of the following portions, depending upon the particular embodiment: an exposure latitude strip 66, a multicolor strip 68, and a plurality of easily recognizable color (ERC) strips 70. (Easily Recognizable Color is a trademark of Gamma & Density Company, the assignee of the present invention.) These as well as other features of the control chart 50 will be described in more detail below.

Control Strips

Complementary to the control chart 50 located on the set 10 are a plurality of control strips 72*a*–72N located at the production facility 12. An exemplary embodiment of one of the control strips 72 is illustrated in FIG. 5. Each of the control strips 72 corresponds to a type of film used in motion picture production; that is, each of the control strips 72 is formed from a strip of film 74, which strip of film 74 is a particular type of film commercially available from a particular manufacturer. For example, one of the control strips 72 is made from Kodak™ 5296 film; another one of the control strips 72 is made from Kodak 7298 film; and another one of the control strips 72 is made from Fuji™ 8531 film. As there are more than 20 commercially available films, there are correspondingly more than 20 control strips 72 provided for the use of the telecine colorist 36 at the production facility 12. Each of the control strips 72 has a label corresponding to the type of film from which it is made, and is preferably mounted on a reel compatible with the telecine machine 38 and stored in a labelled canister (as shown in FIG. 1).

Each of the control strips 72 has a plurality of frames 76 exposed on the strip of film 74. Each of the frames 76 contains an image of a strip control chart 78, examples of which are respectively illustrated in FIGS. 6, 7, and 8. More specifically, in FIG. 6 a portion of the control strip 72 with one of the frames 76 having an image of a strip control chart 78a is shown; in FIG. 7 another portion of the control strip 72 with another one of the frames 76 having with an image of a second strip control chart 78b is shown; and in FIG. 8 yet another portion of the control strip 72 with yet another one of the frames 76 having an image of a third strip control chart 78c is shown. Any number of consecutive frames 76 may contain an image of the same strip control chart 78.

Each of the strip control charts 78 is designed to aide the telecine colorist 38 in performing a particular task. For example, the strip control chart 78a shown in FIG. 6 may be used in transferring images from film to tape; the strip control chart 78b shown in FIG. 7 may be used in negative-to-positive processing; and the strip control chart 78c shown in FIG. 8 may be used in adjusting color monitors, as discussed in more detail below.

In addition, each of the strip control charts 78a–78c contains at least some of the same information which is contained on the control chart 50 used on the set 10. For example, at least one (preferably each) of the strip control charts 78 includes the same reflectance area 52, comprised of the same plurality of fields 54, as that of the control chart 50. Further, at least one of the strip control charts 78 includes the same exposure latitude strip 66, the same multicolor strip 68, and the same plurality of easily recognizable color strips 70.

Figure 8:
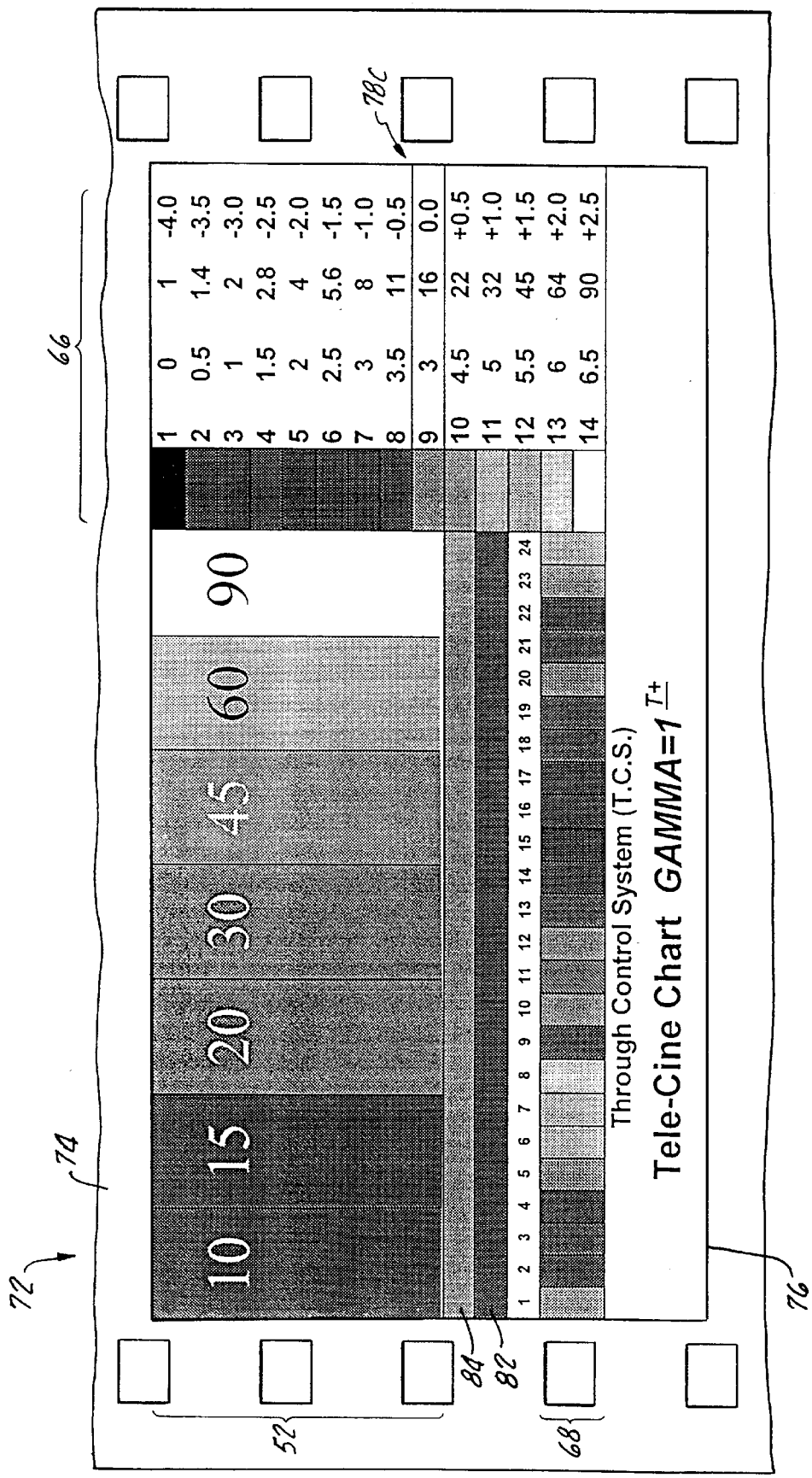
FIG. 8 is a plan view similar to those of FIGS. 6 and 7, illustrating yet another exemplary embodiment of a strip control chart according to the invention.

Within each of the strip control charts 78, any one of the particular areas of the chart may be increased in size (relative to the that of the control chart 50) to aide the telecine colorist 36 in a particular task. For example, the reflectance area 52 in strip control chart 78c in FIG. 8 is large in size as compared to that in strip control chart 78a. Each of the particular areas in the strip control charts 78 may be used by the telecine colorist 36 in performing tasks, as detailed below.

Adjusting the Telecine Machine

Figure 9:
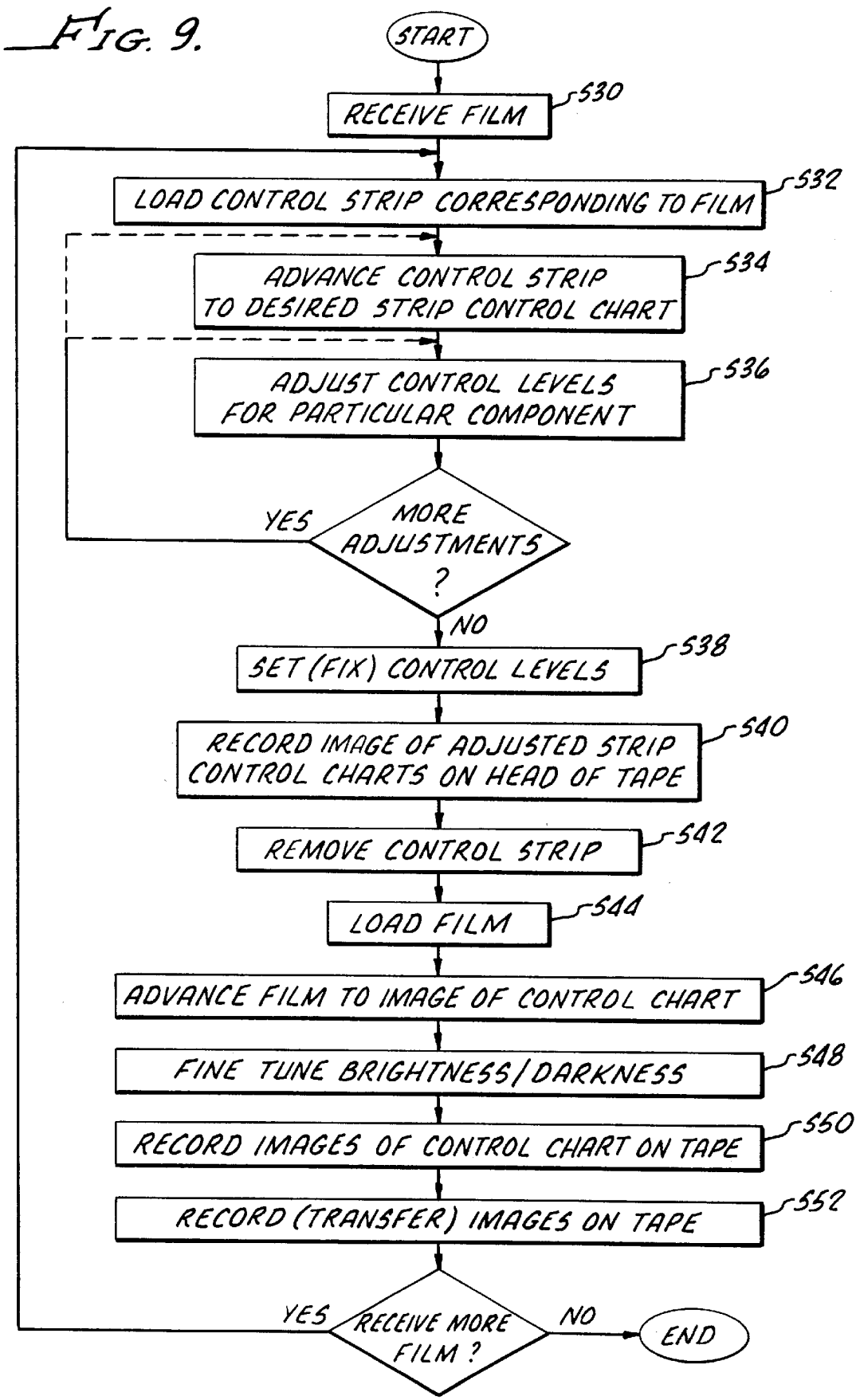
FIG. 9 is a flow chart outlining steps for transferring images from film to videotape according to the film-to-video control principles of the invention.

With additional reference to FIG. 9, upon receiving the exposed processed negative film 20 from the set 10 (step S30), the telecine colorist 36 at the production facility 12 adjusts the telecine machine 38. Firstly, the telecine colorist 36 needs to determine what type of film the exposed film 20 is, and then to load the control strip 72 corresponding to the exposed film 20 into the telecine machine 38 (step S32). The control strip 72 is advanced through the telecine machine 38 until the desired strip control chart 78 is displayed on the monitor 40 (step S34). For example, if the telecine colorist 36 is to perform a film-to-tape transfer, the control strip 72 may be advanced until the strip control chart 78c is displayed on the monitor 40. In the context of this description, the telecine machine 38 may include amplifiers, coders, enhancers, color correctors, and so on, to obtain electronic interpretations of the images on the film 20 and then to manipulate or control those images.

Figure 10:
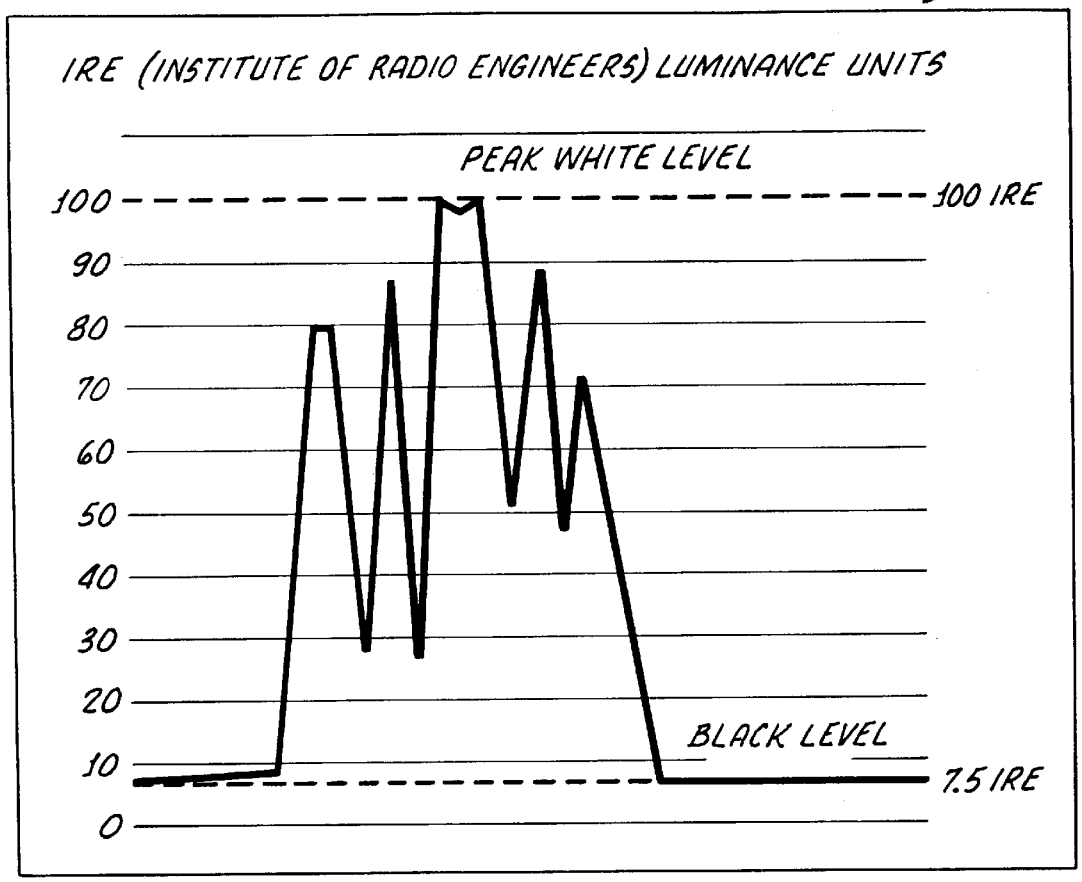
FIG. 10 is a graph illustrating an example of an electronic video signal.

At this point, the particular strip control chart 78 is displayed on the monitor 40 and the corresponding video signal 80 is displayed on the waveform monitor 41, an example of which is shown in FIG. 10. As mentioned previously, each of the strip control charts 78 is preferably designed to highlight a particular component of an image on the film 20, so that the telecine colorist 36 can adjust the controls of the telecine machine 38 corresponding to that particular component (step S36), the controls being located on the control panel 43. For example, if strip control chart 78c is displayed, which chart highlights reflectance components of the fields 54, then the telecine colorist 36 will adjust the controls corresponding to reflectance. The adjustment of particular components will be described in more detail below. After adjusting for a particular component in the video signal 80, if more components are to be adjusted, the telecine colorist 36 may repeat step S34 and/or step S36. If not, the control levels which were adjusted on the telecine machine 38 are set, that is, locked or fixed in place, at the adjusted and corrected level (step S38).

At this point, the telecine colorist 36 may proceed with a film-to-video transfer. However, prior to doing so, it is preferable to record, that is, to transfer, images of the adjusted strip control charts 78 at the beginning or the head of the videotape 47 (step S40). By recording the charts 78 (for example, for about 30 seconds), when the videotape 47 is returned to the cinematographer 14 on the set 10, the monitor or television set 25 playing the videotape 47 may be adjusted as described in detail below. The control strip 72 is then removed from the film chamber 44 of the telecine machine 38 (step S42), and the negative film 20 is loaded therein (step S44).

The film 20 is advanced to the image(s) of the control chart 50 at the head of the film 20 on which the scene 16 is shot (step S46). If necessary, the darkness and the brightness of the image may be fine tuned (step S48), with the video signal of the control chart 50 displayed, through the use of the gain (related to white level), pedestal (related to black level), and chrominance (related to color) controls on the telecine machine 38. It is important to note that none of the previous adjusted and set controls (steps S36 and S38) is changed or readjusted at this time. Preferably, images of the control chart 50 on the film 20 are recorded on the tape 47 (step S50) at this time, prior to transferring the images on the film 20 to the videotape 47 (step S52).

According to the preceding process, the videotape 47, as shown in FIG. 11, consists of, from head to tail, footage of the adjusted strip control charts 78, footage of the control chart 50 shot on the set 10, and footage of the shot itself. If the telecine colorist 36 receives more film from a set, then the colorist 36 needs to begin the process by loading the control strip 72 corresponding to the received film into the machine 38 (step S32).

Categories of Adjustment

Figure 6:
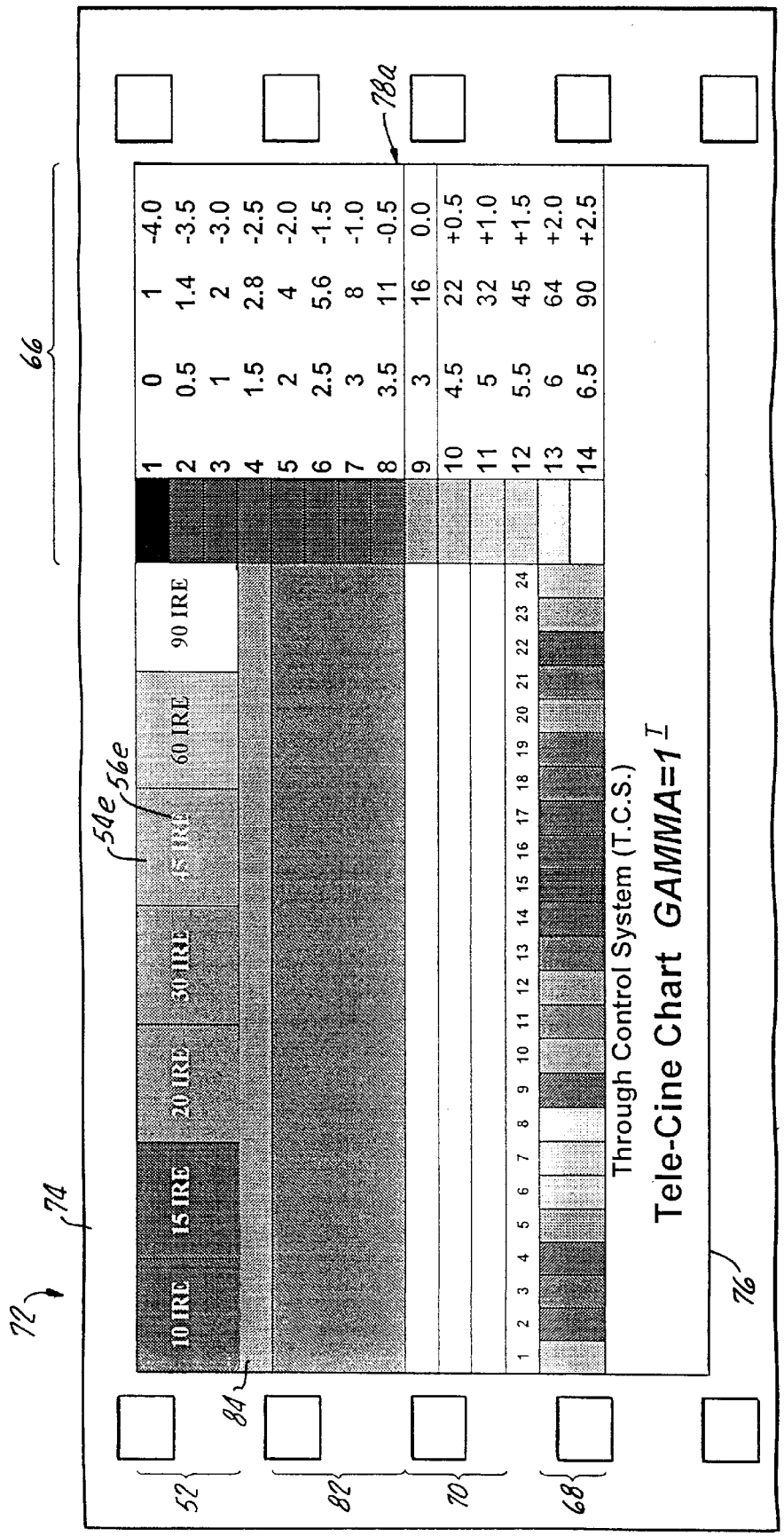
FIG. 6 is a plan view of a section of a control strip illustrating an exemplary embodiment of a strip control chart in accordance with the present invention.
Figure 7:
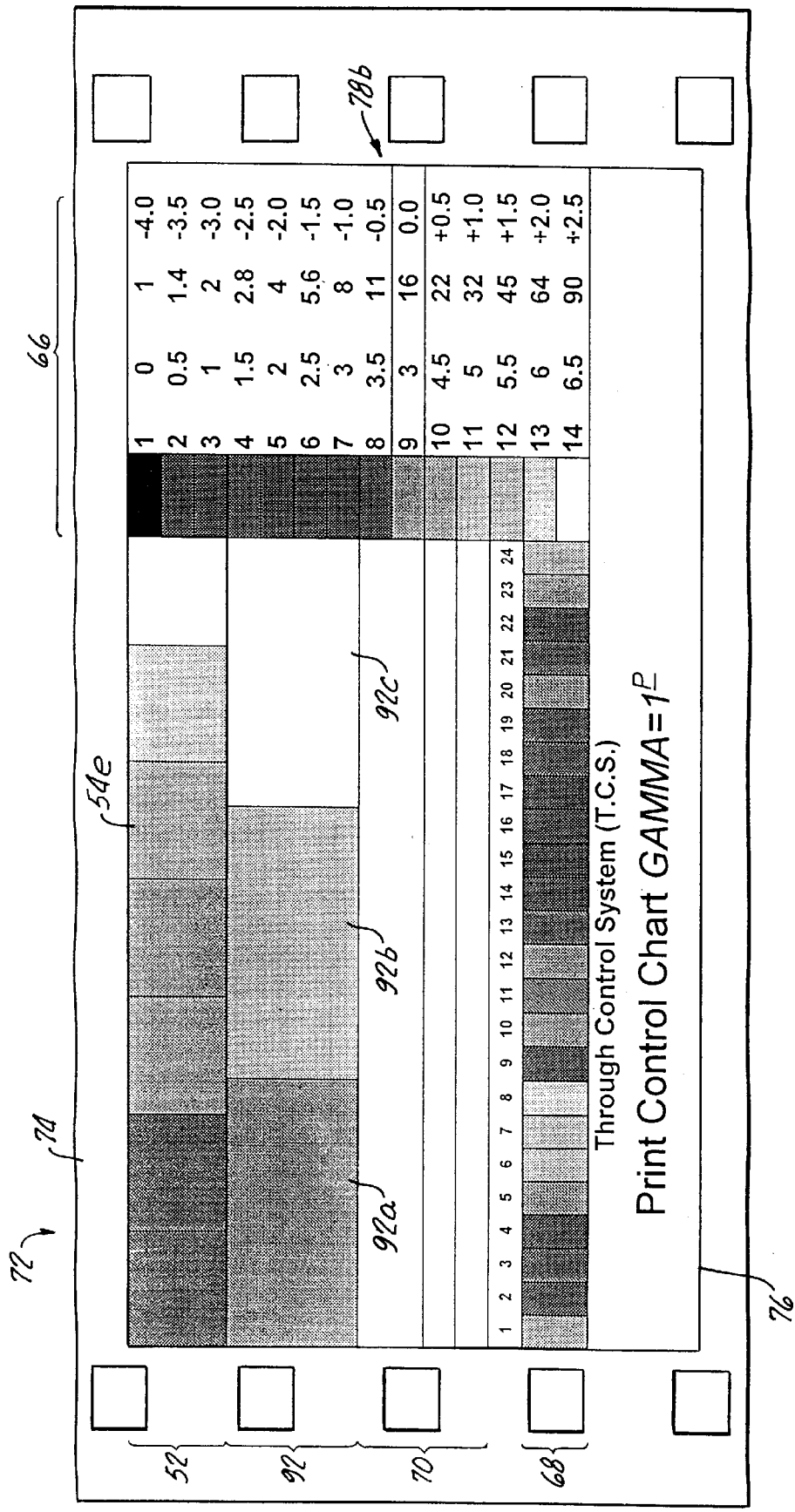
FIG. 7 is a plan view similar to that of FIG. 6, illustrating another exemplary embodiment of a strip control chart according to the invention.

FIGS. 12, 13, and 14 illustrate three different categories of adjustment which may be made during the telecine process (at steps S34 and S36), each of which corresponds to the strip control charts 78a–78c shown in FIGS. 6, 7, and 8.

Figure 15:
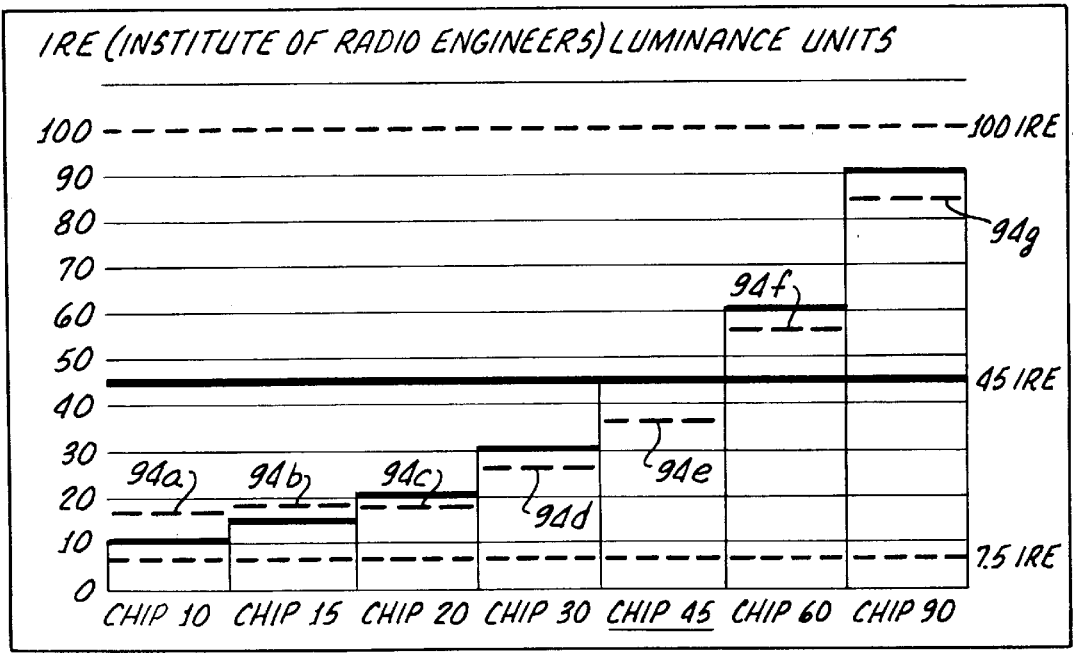
FIG. 15 is a graph illustrating a video signal of a reflectance area of a control chart according to the film-to-tape transfer principles of the invention.

First of all, referencing FIGS. 6 and 12, the telecine colorist 36 may advance the control strip 72 to the red-highlighted strip control chart 78a (step S34a). Strip control chart 78a includes an enlarged red section 82 and also preferably includes an 18% grey strip 84 (in addition to the 18% grey field 54e of the reference area 52). The red section 82 enables the telecine colorist 36 to adjust and to set the color red on the vectorscope 42 of the telecine machine 38. The 18% grey strip 84, which is equal to 45 IRE units, allows the telecine colorists 36 to initially adjust the telecine machine 38 by positioning the grey strip 84 across the 45 IRE mark on a video signal 85 displayed on the waveform monitor 41 as shown in FIG. 15.

It may be useful during the transfer process (for example, between steps S50 and S52) to note any differences between the 45 IRE line of strip control chart 78a (or strip control chart 78b or 78c) on the control strip 72 and the level of the 45 IRE field 54e on the control chart 50 shot on the set 10. Any such differences is important to the cinematographer 14, particularly if the film 20 is to be released theatrically. A difference in two (2) points in the IRE level is equal to approximately one (1) printing light, which is known in the art.

Figure 16:
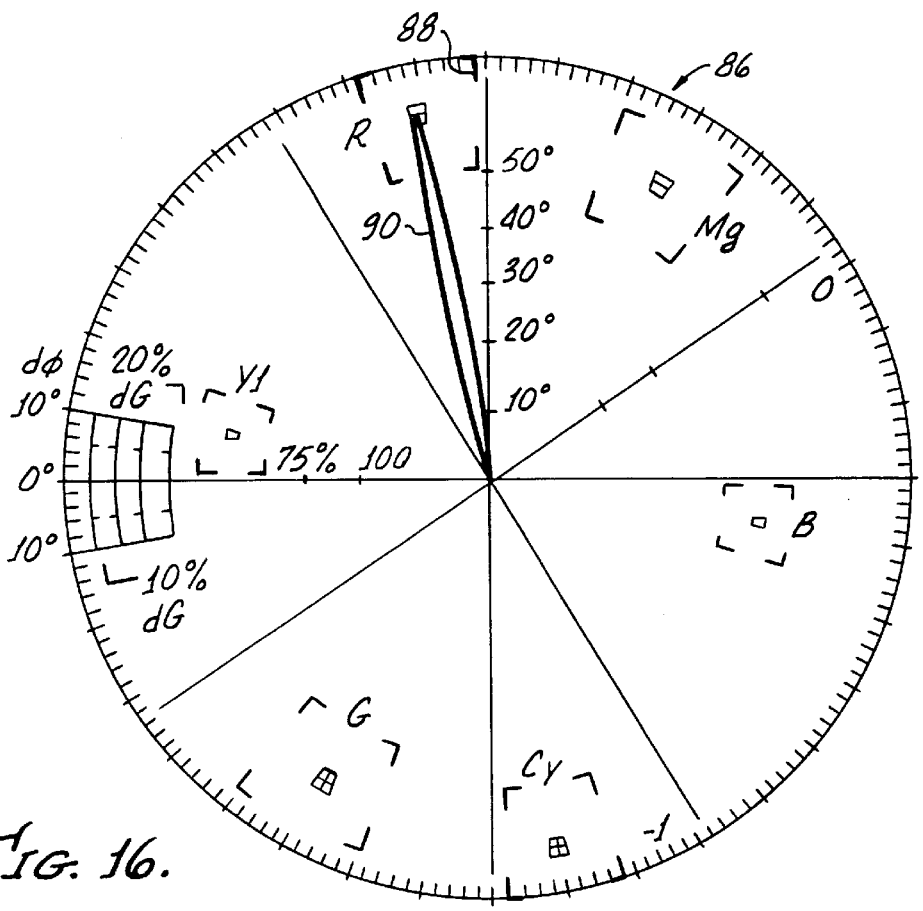
FIG. 16 is a graph illustrating a vectorscope display of a red section of a control chart in accordance with the present invention.

With additional reference to FIG. 16, a display 86 on the vectorscope 42 contains a red fine adjustment box 88 with which the telecine colorist 36 adjusts the "red" of the telecine machine 38 by using a projection 90 of the red section 82. The display 86 of the vectorscope 42 also includes fine adjustment boxes for colors used as references, including magenta, blue, cyan, green, and yellow. However, the "red" of the red section 82 is the closest possible color to any of those used for reference on the vectorscope 42. By adjusting and setting the red reference on the vectorscope 42 (step S36a), the remaining colors will be aligned according to the spectral sensitivities of the particular film stock 20 used to shoot the scene 16.

To adjust the telecine machine 38 for another component, referencing FIGS. 7 and 13, the telecine colorist 36 may advance the control strip 72 to the timing-highlighted strip control chart 78b (step S34b). Strip control chart 78b includes three enlarged fields 92a, 92b, and 92c which respectively correspond to 10, 45, and 90 IRE units. The enlarged fields 92a–92c enable the telecine colorist 36 to measure control densities of positive images on the film 20 (step S36b).

Now referencing FIGS. 8 and 14, to adjust luminance levels of the telecine machine 38, the control strip 72 is advanced to the reflectance-highlighted strip control chart 78c (step S34c). As mentioned above, the video signal 80 displays intensity, that is, the level of luminance of an image on the film 20, in IRE units. As shown in FIG. 15, the control video signal 85 corresponding to the reflectance area 52 of the strip control chart 78c displays luminance levels. In this case, the intensity of each field 54a–54g of the reflectance area 52 is displayed in IRE units and shown in dashed lines labeled as 94a–94g. The scientifically defined luminance level in IRE units, that is, the optimal level, for each of the fields 54 is shown in solid black line. As the telecine colorist 36 is focussing on the luminance of the reflectance area 52, strip control chart 78c is preferably used over strip control chart 78a or 78b because the larger physical size of the reflectance area 52 in each of these charts is easier to use.

As the luminance levels 94a–94g of the fields 54a–54g of image of the control chart 50 on the film 20 may not be aligned with the optimal levels, the telecine colorist 36 adjusts and sets the luminance units displayed on the waveform monitor 41 for each of the reflectance fields 54 until the luminance level for each of the reflectance fields 54 matches the optimal levels (step S36c) displayed on the waveform monitor 41, that is, until the luminance level for each of the reflectance areas 54a–54g respectively equals 10 IRE units, 15 IRE units, 20 IRE units, . . . 90 IRE units. Accordingly, in the example shown, luminance levels 94a and 94b will be adjusted downwardly, and luminance levels 94c–94g will be adjusted upwardly. By setting the luminance level 94 of each field 54 according to its optimal value on the waveform monitor 41, the correct contrast for the video image is achieved.

For color adjustments, the ERC strips 70a–70c are used. For example, one of the ERC strips 70 may correspond to skin tone; another, blue sky; and yet another, greenery. Each of the ERC strips 70 is a linearly blended band of color in which the hue of the color changes gradiently from one end to the other.

Use of Control System in Printing

In addition to the advantages presented above, the transfer-control system of the present invention also provides the ability to judge the exposure quality of the processed negative 20 using IRE designations.

The differences between the mediums of print film and videotape create what is essentially a different range of densities that can be reproduced on each respective medium. With additional reference to FIG. 18, a range of densities 100 for the processed negative 20 and a range of densities 102 for the telecine transfer are illustrated. Only a portion of a range of densities of the processed negative 20 can be printed to have positive densities in which details can be distinguished in the highlights and the shadows of the scene 16.

Figure 18:
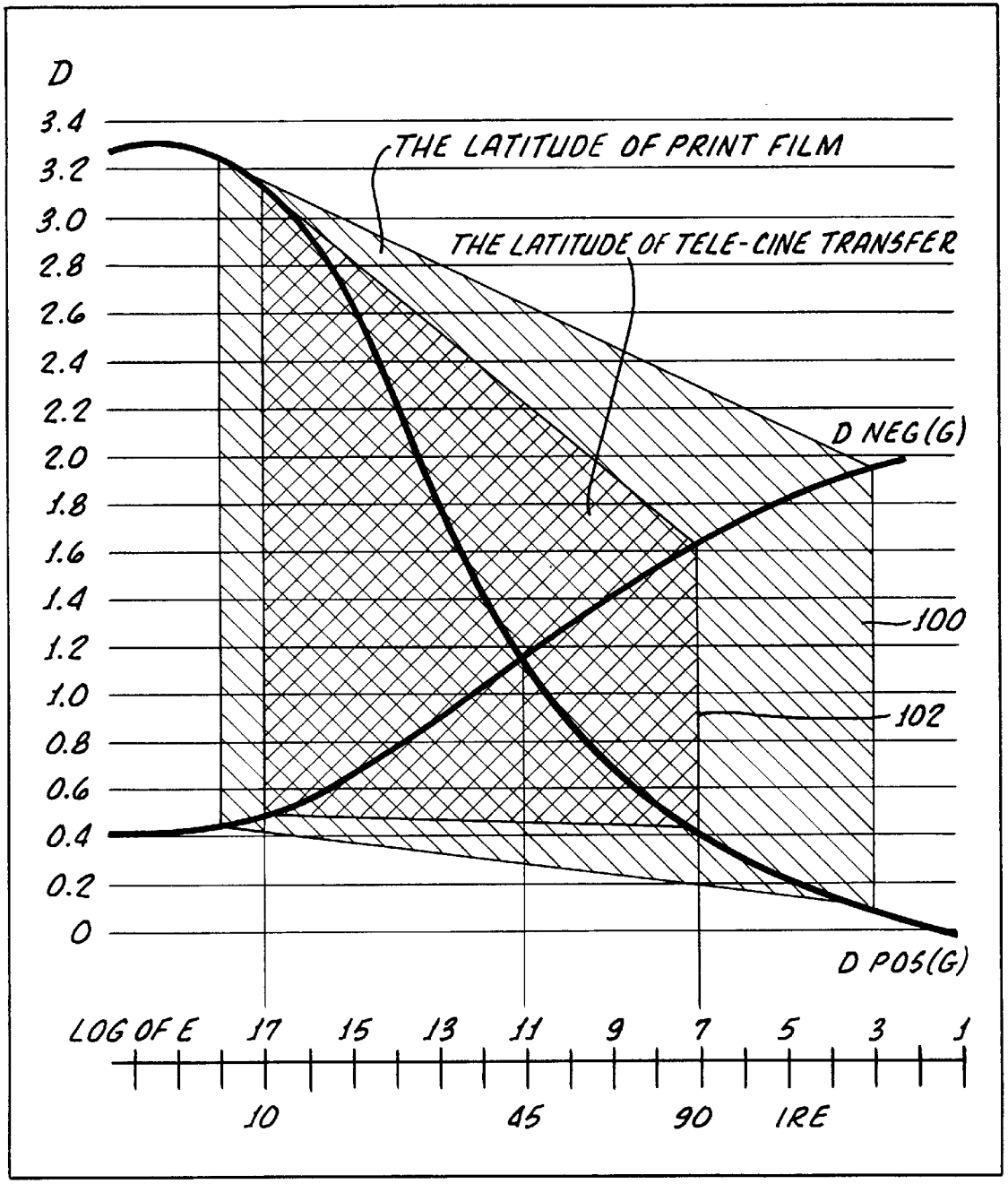
FIG. 18 is a graph illustrating ranges of densities of print film and of videotape transfer.

Even less of the range of densities 100 of the processed negative 20 will transfer to the videotape 47. The graph in FIG. 18 illustrates that the negative 20 destined for print allows the cinematographer 14 to place important details of the scene 16, up to 3.5 f-stops below the key exposure (i.e., the exposure at which the scene 16 was shot) and up to 3.5 f-stops above the key exposure. This difference in exposure yields an exposure latitude index of −3.5/+3.5 f-stops.

Prior to the present invention, conventional video technology limited the exposure latitude of a negative destined for transfer to videotape. For videotape, the useful exposure latitude is less than that for film. While the information, that is, detail of the image exposed on film, may be on the processed negative, none of the information that transfers below 7.5–9 IRE units and above 100 IRE units will be reproduced on the videotape.

In the negative-to-positive printing process, each color lab has its own standards for setting the red (R), green (G), and blue (B) (or cyan, yellow, and magenta) printing lights to achieve the same result in printing from the same negative. For example, Deluxe Colorlab sets the red, green, and blue printing lights on 36, 35, and 25, respectively. These are known as laboratory aim density (LAD) printing numbers. Generally speaking, 6 to 8 settings for the printing lights (depending upon the color-sensitive layer of the negative film) equal one (1) f-stop of exposure. When a cinematographer processes dailies at a colorlab, a lab report is produced which states that the negative for a first scene was printed on lights 36R-35G-25B, and that the negative for a second scene was printed on lights 48R-47G-37B. Accordingly, the cinematographer immediately knows that the first scene is normally exposed but that the second scene was overexposed by approximately two (2) f-stops. Incidently, all negative stocks by all manufacturers are precessed until a specific contrast (i.e., gamma) of the negative is achieved. The universally accepted gamma of color negative film is $\gamma=0.55$, and the standard gamma for black-and-white film is $\gamma=0.65$.

Figure 19:
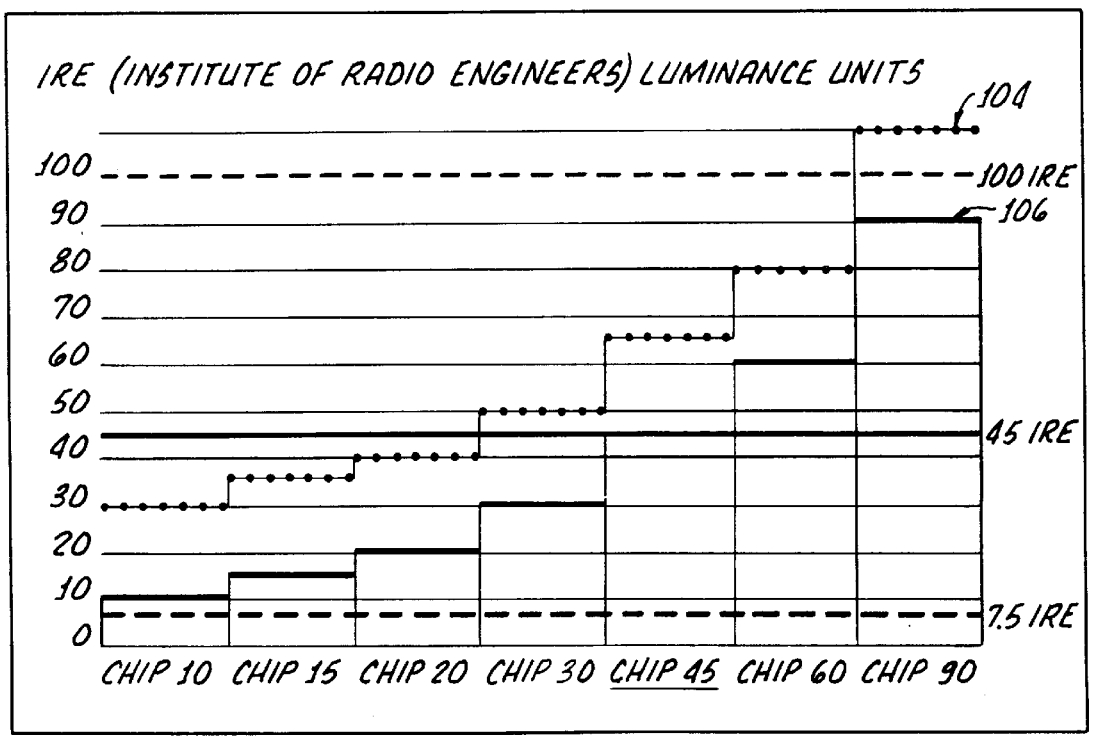
FIG. 19 is a graph of a waveform monitor illustrating an overexposed negative compared to a control strip of the present invention.

By using the transfer-control system of the present invention, the cinematographer 14 may accurately translate IRE units into printing light equivalents. According to the control chart 50 of the present invention, 1 printing light is preferably equal to 2 IRE units. FIG. 19 illustrates the relationship between field 54e corresponding to 45 IRE units of the control chart 50 as exposed on the set 10 (represented by the dotted lines and reference numeral 104) and the same field 54e corresponding to 45 IRE units of strip control chart 78a of the control strip 72 (represented by the solid lines and reference numeral 106), as displayed by the waveform monitor 41. The difference between the IRE levels of the two control charts 50 and 78a may be stated in timing light equivalents.

For example, after setting the 45 IRE field of the strip control chart 78a of the control strip 72 on the 45 IRE mark on the waveform monitor 41 as described above, the telecine colorist 36 then loads the processed negative 20 from the set 10 on the telecine machine 38 and advances the negative 20 to the images of the control chart 50. If the 45 IRE field of the processed negative 20 falls on about the 65 IRE mark of the waveform monitor 41 as shown, then this indicates that the processed negative 20 needs to be printed about 10 printing lights higher than the LAD printing numbers of the color lab. Accordingly, the cinematographer 14 immediately knows that the negative 20 is overexposed and can take the necessary steps to correct the problem (assuming the overexposure was unintentional).

Adjusting Location Monitor for Videotape Playback

A persistent problem in the use of video dailies is the inconsistency between video monitors on which the videotape 47 is played for the cinematographer 14. This is especially a problem when using NTSC videotape. Therefore, it is preferable if the cinematographer 14 is able to adjust the monitor 25 on which he or she is going to view the videotape 47.

To do this using the transfer-control system of the present invention, the following TABLE I may be used for measuring the fields 54 of the control chart 50 displayed on the screen of the monitor 25. These measurements may be done with a spotmeter using exposure value (EV) numbers.

TABLE I

| | IRE | | | | |
|---|---|---|---|---|---|
| | 10 | 20 | 45 | 60 | 90 |
| EV | 1.9 | 2.6 | 6.4 | 7.5 | 9.0 |

To adjust the monitor 25, the spotmeter should be set to ASA 100 and the time of exposure to 1/50 of a second, and the monitor 25 is set to gray scale. Using the images of either the control chart 50 or one of the strip control charts 78 recorded at the head of the videotape 47 (as shown in FIG. 11), luminance of the fields 54 may be measured with the spotmeter, with the EV units of the monitor 25 then adjusted accordingly to match the IRE units by 5 adjusting the gain. The color fields 68 and the ERC strips 70 may also be used to adjust the color of the monitor 25.

Preferred Embodiment of the Control Chart

As previously mentioned, the control chart 50 preferably includes the exposure latitude strip 66, the multicolor strip 68, and the plurality of ERC strips 70. Further referencing FIG. 4, the exposure latitude strip 66 allows on-the-spot analysis of contrast and latitude of the film stock 20 as well as negative and print stocks. The exposure latitude strip 66 preferably includes a plurality of fields 96, for example, 14.

Each of the fields 96 is equal to a one-half stop difference in exposure. The fields 96 of the exposure latitude strip 66 are preferably numbered according to the one-half stop exposure differences from neutral 18% grey (shown in Arabic numerals) and according to the 9-zone system (shown in Roman numerals) developed by the photographer Ansel Adams.

The multicolor strip 68, preferably consisting of 24 fields of color, is designed to compare the color sensitivity and color bias of different film stocks. By numbering each field of the multicolor strip 68, the colors can be compared not only by verbal description but also by using the assigned numbers. This numbering system facilitates communication between the cinematographer 14 and the telecine colorist 36.

The plurality of ERC strips 70a–70c preferably includes strips corresponding to skin tone, blue sky, and greenery, labeled as such in FIG. 4. The cinematographer 14 can choose according to his or her preference, any area from the ERC strips 70 for use as a reference point for color adjustments. Like the multicolor strip 68, the ERC strips 70 also help in communication between the cinematographer and the telecine colorist.

Regarding the reference information area 58, each of the indicia blocks 60 provides a different category of information, and each of the label blocks 62 provides a specific type of information within each category. Preferably, indicia block 60b reads "Filter", and indicia block 60c reads "Stock Manufacture", which are both described above. Also, indicia block 60a preferably reads "Set Up For." Label block 62a corresponding to indicia block 60a may then be labelled either GREY, CORAL, SUNSET, DAY, NIGHT and so on, to indicate to the timer that the scene shot on the film 20 contains special color and tone adjustments made deliberately by the cinematographer 14 which are not to be corrected by the timer.

With additional reference to FIG. 20, the system of the present invention preferably includes a plurality of reference labels, shown divided into three sets of reference labels including reference labels 98a corresponding to indicia block 60a labeled "Set Up For," reference labels 98b corresponding to indicia block 60b labelled "Filter," and reference labels 98c corresponding to indicia block 60c. Each of the labels 98 is preferably magnetic so as to be removable from a complementary magnetic label block 62a–62c. The reference labels 98 and corresponding label blocks 62 allow the cinematographer 14 to change the information area 64 easily on the control chart 50 according to each particular shot.

The control chart 50 is preferably but not necessarily made from a substantially rigid, rectangular piece of material, for example, such as a high-quality plastic material. The control information (that is, the reference area 52, the exposure latitude strip 66, etc.) may be printed on a separate sheet of material which is then adhered to a rigid plastic material. In addition to the embodiment shown in FIG. 4, the system information 64 may also be printed on a separate sheet of material adhered to the back of the rigid plastic material, preferably including instructions for the telecine colorist along the following lines: "Please adjust levels of IRE units on the waveform monitor according to marks on the control images on the control strips. Then, without changing any of the gamma (i.e., contrast) controls, cautiously adjust gain and pedestal controls to fine tune brightness and darkness of each scene, using the image of the control chart shot on the set as a reference."

In addition to the film-to-videotape transfer described above, the transfer-control system of the present invention may be used in negative-to-positive processes, color and tone correlation between different image setting systems, and color monitor adjustment. It may be used with all commercially available recording media such as photographic film, including color and black-and-white films, both motion picture and still (in any size such as 16 mm, 35 mm, and so on), infrared film, digital CCD pixel arrays, laser and optical discs, computer (e.g., floppy) discs, videotape, such as PAL, NTSC, and SECAM, and so on. In other words, recording medium in the context of the present invention may be any medium on which an image is able to be recorded by any means. The control system of the present invention is readily applicable to many industries, including motion picture, television, music, law, medicine, and science.

Relevant Terms in the Art

In order for those people who do not possess a high level of skill in the art, definitions of the following relevant terms in the art are provided to enable such people to understand more fully the principles of the present invention.

Brightness (B): The designation of the light emission of a light source or luminary surface in a certain direction.

Coefficient of contrast (γ): A quantitative characteristic of light-sensitive materials's ability to reproduce the difference in exposure of details in the image by the difference in the respective densities.

Coefficient of reflectance (r): A value in direct ratio between the amount of light reflected from the surface to the light incident on the surface. The coefficient of reflectance for the standard gray card is 0.18 or 18%.

Chrominance: Defined in terms of the hue and saturation component of a color. On a Vectorscope, hue is represented as the degree of the circle, and saturation is represented as the distance from the center.

Contrast: The relationship between the lightest and darkest parts of an image. Contrast of the scene is measured as the relationship between minimal and maximum brightness (Bmin/Bmax). The contrast of photographic images is measured as the relationship between minimum and maximum densities (Dmin/Dmax).

Density (D): A value expressed as the direct ratio between the amount of light falling on a transparent (or reflective light sensitive) material to the light transmitted (or reflected) by the material.

Exposure (E): The measurement of the quantity of light energy influencing a light-sensitive material during a certain period of time. Exposure depends on illuminance (I) and time of exposure (t) and is expressed by the formula $E=It$.

Exposure value (EV): A number which characterizes the conditions of correct exposure. Exposure value is relative to different combinations of exposure time and f-stops. Each unit of exposure value corresponds to doubling (or halving) the time of exposure or changing the aperture one f-stop. When shooting motion picture film, the time of exposure is constant, and speed of the stock remains the same; thus, exposure values can be used to calculate the contrast ratio for a scene quickly.

Film: A light-sensitive medium on which an image or a series of images is photographed.

Frame: A photographic image on a piece of film.

Hue: Indicates the gradation of color or the attribute of colors that permits them to be classed as red, yellow, green, blue, or an intermediate color between any contiguous pair of these colors.

Illuminance: The luminous flux per unit area on an intercepting surface at any given point.

Intensity: Relates to the density or brightness qualities of a color.

IRE luminance units: Units designating the level of video signals on a waveform monitor. [IRE stands for "Institute of Radio Engineers," currently the Institute of Electrical and Electronic Engineers (IEEE).] A peak-white level is defined as 100 IRE luminance units, and a black level is defined as 7.5 IRE luminance units. For broadcast specifications, these two IRE levels respectively represent the absolute maximum and minimum levels of a video signal.

Laboratory aim density (LAD): A printing control method which assigns specific correlated densities for each negative and positive film stock to achieve controllable and constant results during the processing and time of film.

Latitude (L): Characterizes the ability to reproduce in the same proportion the contrast differences in the brightness of a scene on light-sensitive material. Latitude is expressed as the ratio between exposures marked on the characteristic curve at the beginning and at the end of the curve, respectively.

Luminance: Relates to the black-and-white aspect of a frame.

Photoelectronic circuit (PEC): A device in a telecine machine which governs the control of the red, blue, and green aspects of negative images during the telecine process.

Psychologically identical images: Images which seem to be exceptionally true to nature, as oppose to images (e.g., photographs and motion picture) which are not exact re .
. .

Saturation: Relates to chromatic purity (i.e., the freedom from dilution with white) or the degree of difference from the gray having the same lightness.

Sensitometry: The study of photographic qualities in light-sensitive materials. Sensitometry provides a means for sensitometric control to ensure the compliance with standards by checking the gamma, speed, densities, and other parameters during film processing.

Shot: A consecutive series of unbroken frames on one piece of film from a motion picture camera. The frames are photographic images of a scene.

Telecine process: The process of transferring images from film to video. Coined after the introduction of the Rank-Cintel Color Tele-Cine Device (pronounced TELL-A-SEE-KNEE).

Tonal rendition: The reproduction of the brightness of a scene expressed by differences in the densities on the positive print film or the luminance of the video signal as seen on a video monitor. The result of this process is judges subjectively, but the principles of psychologically identical images are most likely to be achieved if the resulting gamma of the negative and positive gamma equals one, i.e., $\gamma(\text{negative}) \times \gamma(\text{positive}) = 1$.

Vectorscope: An oscilloscope used to monitor color information of a video signal. Hue and saturation are displayed on a circular grid corresponding to the phase and amplitude of the signal's chrominance information.

Waveform monitor: An oscilloscope used to monitor and evaluate the video signal. It may display a graphical representation of the video signal which provides information about video IRE levels, timing, and blanking signals.

Those skilled in the art will understand that the preceding exemplary embodiments of the present invention provide foundation for numerous alternatives and modifications. These other alternatives and modifications are also within the scope of the image-transfer system of the present invention. Accordingly, the present invention is not limited to that precisely shown and described herein.

What is claimed is:

1. A system for controlling the transfer of an image recorded on a first recording medium to a second recording medium, the first recording medium belonging to a first category of recording media and the second recording medium belonging to a second category of recording media, which two categories of recording media are incompatible, the transfer of the image being conducted by a transfer machine including a plurality of settings which control the transfer of the image, said system comprising:

a) a control chart including a set of chart control information; and b) a plurality of control strips each including a set of strip control information;

said control chart being recordable on the first recording medium under substantially the same conditions under which the image is recorded onto the first recording medium;

each of said control strips being formatted to correspond to a different recording medium included in the first category of recording media such that one of said control strips corresponds to the first recording medium;

said set of strip control information on each of said control strips including information substantially the same as information included in said set of chart control information; and said sets of chart and strip control information including information for use in adjusting the settings of the transfer machine such that the integrity of the image transferred to the second medium is substantially the same as the integrity of the image recorded on the first recording medium.

2. The system of claim 1 further comprising a plurality of removable labels, the plurality of removable labels including:

a first set of removable labels each respectively corresponding to a recording medium in the first category of recording media;

wherein said control chart further includes an information area having a locale at which the removable label corresponding to the first recording medium is positionable.

3. The system of claim 2 wherein said plurality of removable labels further includes:

a second set of removable labels each respectively corresponding to a different effect used in recording the image onto the first recording medium;

wherein said information area of said control chart includes a locale at which the removable label corresponding to said effect is positionable.

4. The system of claim 3 wherein said plurality of removable labels further includes a third set of removable labels each respectively corresponding to a different condition under which the image is recorded onto the first recording medium;

wherein said information area of said control chart includes a locale at which the removable label corresponding to said condition is positionable.

5. The system of claim 2 wherein said removable labels are magnetic.

6. The system of claim 1 wherein said sets of chart and strip control information include information for adjusting density settings of the transfer machine.

7. The system of claim 1 wherein said sets of chart and strip control information include information for adjusting luminance settings of the transfer machine.

8. The system of claim 1 wherein said sets of chart and strip control information include information for adjusting a color setting of the transfer machine.

9. The system of claim 1 wherein said control chart is recordable onto motion-picture film;

each of said control strips being formatted according to a different commercially available motion-picture film.

10. The system of claim 9 wherein said sets of chart and strip control information include information for use in adjusting the settings of the transfer machine such that the integrity of the image transferred to videotape is substantially the same as the integrity of the image recorded on the motion-picture film.

* * * * *